United States Patent [19]
Saito et al.

[11] Patent Number: 5,436,987
[45] Date of Patent: Jul. 25, 1995

[54] TRANSMISSION LINE SWITCHING APPARATUS INCLUDING CONNECTED OPTICAL FIBERS

[75] Inventors: Kazuhito Saito, Yokohama; Makoto Sato, Katsuta; Hideo Kobayashi, Mito, all of Japan

[73] Assignees: Sumitomo Electric Industries, Ltd., Osaka; Nippon Telegraph & Telephone Corporation, Tokyo, both of Japan

[21] Appl. No.: 240,581

[22] Filed: May 10, 1994

[30] Foreign Application Priority Data

| | | |
|---|---|---|
| May 10, 1993 [JP] | Japan | 5-108258 |
| Aug. 12, 1993 [JP] | Japan | 5-200696 |
| Sep. 16, 1993 [JP] | Japan | 5-230288 |
| Sep. 17, 1993 [JP] | Japan | 5-231608 |

[51] Int. Cl.⁶ .......................... G02B 6/26; G02B 6/28; B25J 11/00
[52] U.S. Cl. ........................... 385/16; 385/17; 385/24; 385/25; 385/31; 385/39; 385/53; 385/55; 385/71; 385/72; 385/77; 385/78; 385/139; 901/16; 901/47
[58] Field of Search ........... 385/15, 16, 17, 20, 385/22, 23, 24, 25, 31, 39, 53, 56, 71, 72, 76, 77, 78, 139; 901/8, 16, 1, 47, 50

[56] References Cited

U.S. PATENT DOCUMENTS

| | | | |
|---|---|---|---|
| 4,886,335 | 12/1989 | Yangagawa et al. | 385/16 X |
| 4,955,686 | 9/1990 | Buhrer et al. | 385/16 X |
| 5,031,994 | 7/1991 | Emmons | 385/16 X |
| 5,033,813 | 7/1991 | Westfall | 385/16 X |
| 5,050,955 | 9/1991 | Sjölinder | 385/17 |
| 5,110,194 | 5/1992 | Zurfluh | 385/16 |
| 5,175,777 | 12/1992 | Böttle | 385/17 |
| 5,177,804 | 1/1993 | Shimizu et al. | 385/16 |
| 5,337,378 | 8/1994 | Saito et al. | 385/16 |
| 5,386,485 | 1/1995 | Saito et al. | 385/17 |

FOREIGN PATENT DOCUMENTS

| | | | |
|---|---|---|---|
| 0323920 | 7/1989 | European Pat. Off. | 385/16 X |
| 0558025 | 9/1993 | European Pat. Off. | 385/16 X |
| 63-200116 | 8/1988 | Japan | 385/17 X |
| 2-99908 | 4/1990 | Japan | 385/17 X |
| 4-342220 | 11/1992 | Japan | 385/17 X |
| 6-138405 | 5/1994 | Japan | 385/17 X |

OTHER PUBLICATIONS

Patent Abstracts of Japan, vol. 12, No. 488 (P-803) (3335) Dec. 20, 1988 & JP-A-63 200 116 (Fujikura) Aug. 18, 1988.
Yoshida et al, "A New Automated Main Distributing Frame System Using Robot", International Conference on Communications, vol. 2/3, Jun. 1991, Denver, USA, pp. 977-982.

*Primary Examiner*—Brian Healy
*Attorney, Agent, or Firm*—Cushman Darby & Cushman

[57] ABSTRACT

A transmission line switching apparatus comprises an optical fiber connecting board for holding a plurality of first optical fibers, an optical fiber arranging board, arranged apart from the connecting board with a predetermined spacing between them in the horizontal direction, for holding a plurality of second optical fibers, and a robot for handling the second fibers. Each second optical fiber extends to the connecting board through the arranging board, and the distal end of the second optical fiber is detachably attached to the connecting board so as to be selectively connected to one of the first optical fibers. When the distal end of the second optical fiber is attached to the connecting board, the second optical fiber is laterally extended in a loosened state between the two boards. In this state, the entangled states of the second optical fibers near the two boards are sparser than that in the intermediate position between the two boards. Therefore, the robot can easily handle the second optical fiber.

40 Claims, 20 Drawing Sheets

TRANSMISSION LINE SWITCHING APPARATUS INCLUDING CONNECTED OPTICAL FIBERS

BACKGROUND OF THE INVENTION

1. Field of the Invention

The present invention relates to a transmission line switching apparatus and a transmission line switching method which can be applied to a switching apparatus of a communication network using optical fibers.

2. Related Background Art

As shown in FIG. 1, a conventional optical fiber switching apparatus includes an optical fiber connecting board 5 for connecting a plurality of first optical fibers 2 of a first optical fiber cable 1, such as an office optical fiber cable, to a plurality of second optical fibers 4 of a second optical fiber cable 3, such as a subscriber optical fiber cable.

A plurality of through holes are formed in a matrix form in the optical fiber connecting board 5, and a connector adapter 6 is fitted in each through hole. A connector plug (not shown) is attached to the end portion of each first optical fiber 2. This connector plug is inserted from one side into the connector adapter 6 and fixed in it. A connector plug 7 is also attached to the end portion of each second optical fiber 4. This connector plug 7 is detachably inserted from the other side into the connector adapter 6. Therefore, it is possible to switch the connections between the first and second optical fibers 2 and 4 by changing the connector adapters 6 into which the connector plug 7 of the second optical fiber 4 is to be inserted.

When the second optical fibers 4 of the second optical fiber cable 3 are inserted directly into the connector adapters 6 of the optical fiber connecting board 5, these second optical fibers 4 are entangled. To reduce this entangled state, therefore, an optical fiber arranging board 8 is disposed horizontally at a position above and in front of the optical fiber connecting board 5. In this optical fiber arranging board 8, through holes are formed in a matrix form so that the second optical fibers 4 are passed through these holes. The second optical fibers 4 are held in a two-dimensionally arranged state after being passed through these through holes. When the connector plugs 7 of the second optical fibers 4 are connected to the optical fiber connecting board 5, the second optical fibers 4 suspended from the optical fiber arranging board 8 are loosened, as illustrated.

Generally, such a switching apparatus is manually handled by a worker. That is, a worker selects one of the second optical fibers 4, as an object to be switched, holds the connector plug 7 of the selected fiber 4 between his or her fingers, and removes the selected fiber 4 from the connector adapter 6 of the optical fiber connecting board 5. Thereafter, the worker inserts the removed connector plug 7 into another connector adapter 6.

In the above-mentioned switching apparatus, the second optical fibers 4 are entangled in front of the optical fiber connecting board 5. Therefore, it is difficult to chose a desired one from these second optical fibers 4.

In addition, the bundle of the second optical fibers 4 in front of the optical fiber connecting board 5 interferes with a rapid operation in inserting the connector plug 7 into the connector adapter 6. Also, there is the possibility that the second optical fibers 4 cross complicatedly one another to worsen the entangled state, as the switching operation proceeds.

Furthermore, in the manual operation performed by a worker, the worker may damage the second optical fibers 4 other than a desired fiber or connect the desired fiber to a wrong position by mistake.

SUMMARY OF THE INVENTION

It is, therefore, a principal object of the present invention to provide a switching apparatus and a switching method capable of rapidly and reliably switching optical fibers, and consequently improving the workability of the switching work or the maintenance work.

To achieve the above object, according to one aspect of the present invention, there is provided a transmission line switching apparatus comprising: a first board for holding a plurality of first transmission lines; a second board for holding a plurality of second transmission lines, the second board being disposed apart from the first board with a predetermined spacing therebetween in a horizontal direction; and a robot for handling a third transmission line constituted by a flexible elongated body, the third transmission line having one end portion adapted to be held by the second board and connected to one of the second transmission lines and other end portion adapted to be detachably attached to the first board so as to be selectively connected to one of the first transmission lines, the third transmission line adapted to be laterally extended in a loosened state between the first board and the second board when the end portions are respectively held by the first board and the second board.

According to another aspect of the present invention, there is provided a transmission line switching method of switching connection positions of a plurality of third transmission lines each constituted by a flexible elongated body laterally extended in a loosened state between a first board for holding a plurality of first transmission lines and a second board, arranged apart from the first board with a predetermined spacing therebetween, for holding a plurality of second transmission lines, one end portion of each of the third transmission lines being held by the second board and connected to one of the second transmission lines, and the other end portion of each of the third transmission lines being detachably attached to the first board so as to be selectively connected to one of the first transmission lines, comprising the steps of: removing the other end portion of one of the third transmission lines from the first board; suspending the third transmission line removed from the first board by a hook in the vicinity of the second board and pulling up the other end portion to be higher than the rest of the third transmission lines laterally extended between the first board and the second board; and connecting the other end portion of the pulled third transmission line to another connection position of the first board.

The first, second, and third transmission lines are preferably optical fibers. Also, in the preferred embodiments, each optical fiber as the second transmission line extends through the second board, and a portion of this optical fiber extending from the second board to the first board constitutes the third transmission line.

In the above arrangement, the first and second boards are spaced apart from each other in the horizontal direction, and the flexible third transmission lines, such as optical fibers, are laterally extended in a loosened state between the two boards. Consequently, the entangled states of the third transmission lines near the first and second boards are simpler or sparser than that in the intermediate position between the first and second boards. This facilitates handling the third transmission lines near the first or second board.

In addition, the third transmission lines are loosened between the first and second boards. Therefore, the robot for handling the third transmission lines is less likely to interfere with the third transmission lines even when the robot is moved between the first and second boards.

Furthermore, in this arrangement, each third transmission line can be easily removed from the first board, and the third transmission line thus removed can be readily found and suspended near the second board. By pulling up this third transmission line to be higher than the other, the entangled state of the third transmission lines can be released temporarily. Therefore, the entangled state does not worsen even if the switching operation is repeatedly performed.

The present invention will become more fully understood from the detailed description given hereinbelow and the attached drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the course of the following detailed description, reference will be made to the attached drawings in which.

DETAILED DESCRIPTION OF THE PREFERRED EMBODIMENT

In the following description, like references characters designate like or corresponding parts throughout the several views. Also in the following description, it is to be understood that such terms as "forward", "backward", "left", "right", "upwardly", "downwardly", and the like, are words of convenience and are not to be construed as limiting terms.

Figure 1:
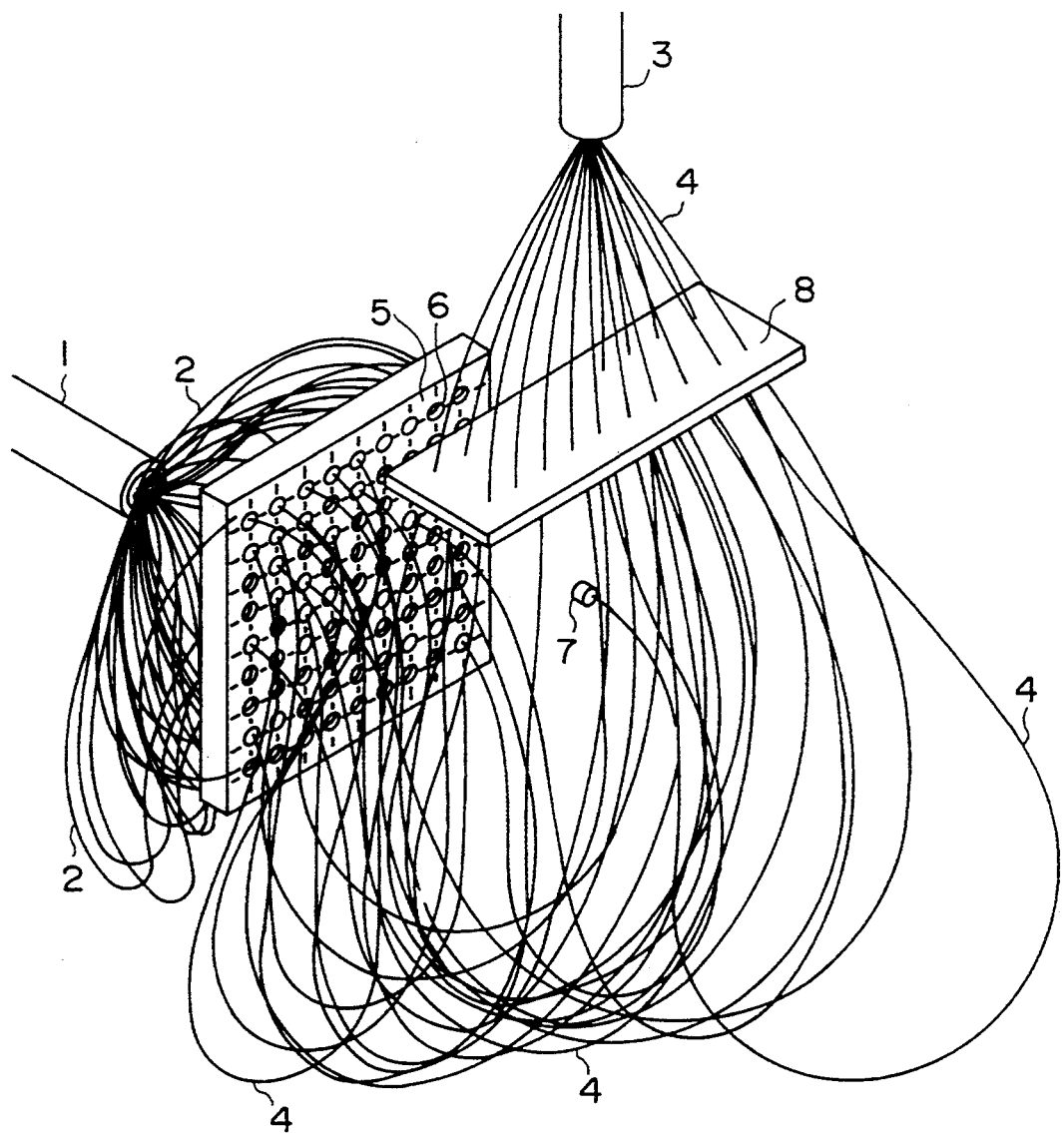
FIG. 1 is a perspective view schematically showing a conventional general optical fiber switching apparatus.
Figure 2:
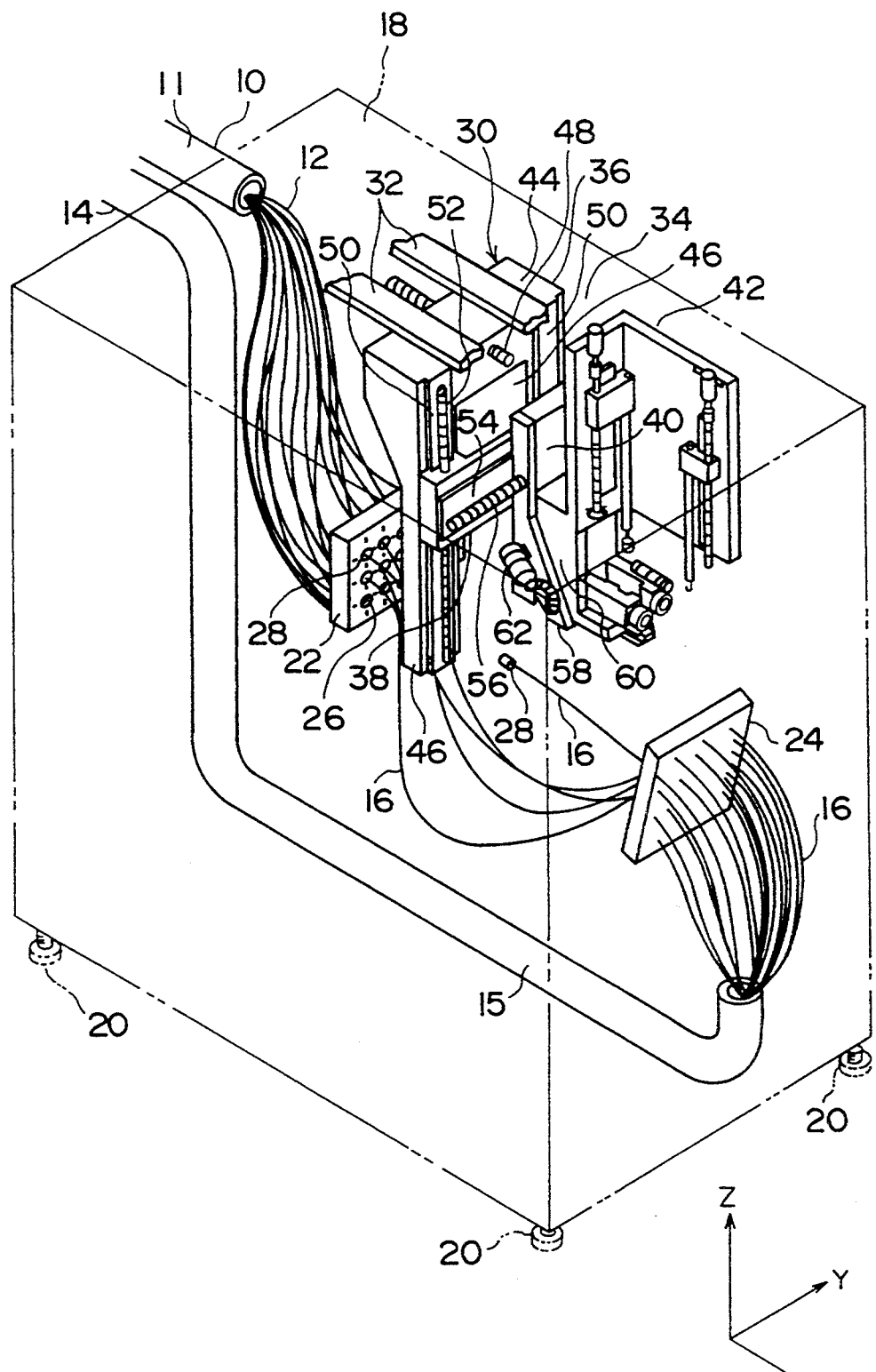
FIG. 2 is a perspective view showing the switching apparatus of the first embodiment of the present invention.

Referring now to the drawings, and particularly, to FIG. 2, there is schematically shown a perspective view of the first embodiment of the transmission line switching apparatus according to the present invention. In the first embodiment, the transmission line switching apparatus is used to switch the connections between a plurality of first optical fibers 12 of a first optical fiber cable 10 (e.g., an office optical fiber cable) and a plurality of second optical fibers 16 of a second optical fiber cable 14 (e.g., a subscriber optical fiber cable).

The first and second optical fiber cables 10 and 14 are fixed through the side wall of a casing 18 of the transmission line switching apparatus. This casing 18 is a box type member having outer dimensions of, e.g., 780 mm×580 mm×800 mm. It is effective to provide leg members 20 for adjusting the degree of horizontality on the bottom surface of the casing 18. The first optical fibers 12 extending from the open end of a jacket 11 of the first optical fiber cable 10 are connected to an optical fiber connecting board 22 mounted nearly vertically in the casing 18 by an appropriate mounting member (not shown). In the casing 18, an optical fiber arranging board 24 is also arranged apart from the optical fiber connecting board 22 with a predetermined spacing between them in the horizontal direction. The second optical fibers 16 extending from the open end of a jacket 15 of the second optical fiber cable 14 are held by the optical fiber arranging board 24.

A plurality of through holes are formed in a matrix form (e.g., 40 holes in the vertical direction, and 50 holes in the horizontal direction) in the optical fiber connecting board 22, and a connector adapter 26 is fitted in each through hole. A connector plug (not shown) is attached to the end portion of each first optical fiber 12. This connector plug is fixed to the optical fiber connecting board 22 by being inserted into a predetermined one of the connector adapters 26 from the side away from the optical fiber arranging board 24.

The optical fiber arranging board 24 holds the plurality of second optical fibers 16 of the second optical fiber cable 14 in a two-dimensionally arranged state. The optical fiber arranging board 24 is mounted in the casing 18 by a proper mounting member (not shown). It is preferable that the upper edge of the optical fiber arranging board 24 be located at the level of or below the lower edge of the optical fiber connecting board 22. The optical fiber arranging board 24 and the optical fiber connecting board 22 can be arranged parallel to each other. For the reasons explained later, however, it is preferable to incline the optical fiber arranging board 24 from the vertical plane with an angle of, e.g., about 5° to about 10° between them, such that the spacing between the upper edge of the optical fiber arranging board 24 and the optical fiber connecting board 22 in the horizontal direction is larger than that between the lower edge of the optical fiber arranging board 24 and the optical fiber connecting board 22 in the horizontal direction.

In the optical fiber arranging board 24, the same number of through holes as the number of the through holes of the optical fiber connecting board 22 are formed in a matrix form (e.g., 40 holes in the vertical direction, and 50 holes in the horizontal direction). Each second optical fiber 16 extending from the open end of the jacket 15 of the second optical fiber cable 14 is inserted, from the side away from the optical fiber connecting board 22, into a predetermined one of the through holes of the optical fiber arranging board 24 and held in that hole. A connector plug 28 is attached to the end portion of each second optical fiber 16. This connector plug 28 is detachably connected to a desired one of the connector adapters 26 from the side of the optical fiber arranging board 24. Therefore, when the connector plug 28 of the second optical fiber 16 is connected to the connector adapter 26, this second optical fiber 16 is optically connected to the first optical fiber 12 corresponding to the connector plug fixed to that connector adapter 26. In this connected state, a portion of the second optical fiber 16 between the optical fiber connecting board 22 and the optical fiber arranging board 24 is sufficiently loosened, in order to prevent inconveniences that, e.g., the connector plug 28 does not reach a certain connector adapter 26 in switching the connector plug 28 of the second optical fiber 16 from one connector adapter 26 to that connector adapter 26. This loosened state also allows an easy access of a switching robot 30 (to be described below) in a space between the optical fiber connecting board 22 and the optical fiber arranging board 24. Therefore, when all of the connector plugs 28 are connected to the connector adapters 26, the second optical fibers 16 are entangled between the optical fiber connecting board 22 and the optical fiber arranging board 24.

The transmission line switching apparatus or optical fiber switching apparatus of the present invention includes the switching robot 30 capable of moving three-dimensionally in the casing 18, and attaching or detaching the connector plug 28 of the second optical fiber 16 with respect to the connector adapter 26 of the optical fiber connecting board 22. The switching robot 30 has a robot main body 34 which can slide along a pair of guide rails 32 arranged on the lower surface of the top plate of the casing 18. Assuming that the direction parallel to the axis of the connector adapter 26 of the optical fiber connecting board 22 is an "X direction", the guide rails 32 extend in this X direction.

The robot main body 34 includes first base 36, second base 38, third base 40 and fourth base 42. The first base 36 is supported on the guide rails 32 and can be reciprocated along the X direction. The second base 38 is supported on the first base 36 and can be reciprocated along a substantially vertical direction (Z direction in FIG. 2). The third base 40 is supported on the second base 38 and can be reciprocated along a direction (Y direction in FIG. 2) perpendicular to the X and Z directions. The fourth base 42 is supported on the third base 40 and can pivot about an axis parallel to the Y direction.

The first base 36 is constituted by a horizontal portion 44 slidably mounted on the guide rails 32 and extending in the Y direction, and vertical portions 46 vertically extending downward from the both sides of the horizontal portion 44. The spacing between the vertical portions 46 is larger than the width of the optical fiber connecting board 22. The first base 36 is disposed on the guide rails 32 so that the space between the vertical portions 46 opposes the optical fiber connecting board 22. A ball screw mechanism is effective as the means for moving the first base 36 along the guide rails 32. This ball screw mechanism consists of a feed screw 48, an internal thread portion, and a plurality of balls (not shown). The feed screw 48 is rotatably supported on the top plate of the casing 18 and extends in the X direction.

The internal thread portion is formed in the horizontal portion 44 of the first base 36 so that the feed screw 48 passes through the thread portion. The balls are arranged in the space between the feed screw 48 and the internal thread portion. The first base 36 can be moved along the guide rails 32 by rotating the feed screw 48 by a motor (not shown).

A guide rail 50 extending in the Z direction is formed on the front surface (pointing in the direction of an arrow X in FIG. 2) of each vertical portion 46 of the first base 36. The second base 38 is mounted between the vertical portions 46 of the first base 36 by, e.g., a dovetail joint so as to be vertically movable along the guide rails 50. The second base 38 is preferably moved vertically by a ball screw mechanism. A feed screw 52 of this ball screw mechanism is rotatably supported at an appropriate position of the first base 36 and extends through the second base 38 in the Z direction. Therefore, by rotating this feed screw 52 by a motor (not shown), the second base 38 can be vertically moved along the guide rails 50 of the first base 36.

A guide rail 54 extending in the Y direction is formed on the front surface of the second base 38. The third base 40 is so mounted on the second base 38 as to be movable along this guide rail 54. It is preferable that this third base 40 also be driven by a ball screw mechanism. A feed screw 56 of this ball screw mechanism is rotatably supported at a proper position of the second base 38 and extends through the third base 40 in the Y direction. By rotating this feed screw 56 by a motor (not shown), the third base 40 can be moved along the guide rail 54 of the second base 38.

A support plate 58 for supporting the fourth base 42 is fixed to each side surface of the third base 40 and extends downward therefrom. The lower portions of these support plates 58 project in the direction of the arrow X, and the fourth base 42 is arranged between these projecting portions. A through hole is formed in each projecting portion, and support shafts on the outer surfaces of side plates 60 of the second base 42 are fitted in these through holes. The support shafts on the side plates 60 of the fourth base 42 are coaxial, and their axis extends in the Y direction. Therefore, the fourth base 42 can pivot about the support shafts on the X-Z plane. One of the support shafts is connected, via an appropriate transmission mechanism such as a gear mechanism, to the rotating shaft of a motor 62 fixed to the support plate 58 of the third base 40. By controlling the motor 62, therefore, the fourth base 42 can be pivoted between an upright position (see FIG. 5) in which the base 42 is vertical and a lateral position (see FIG. 6) in which it is horizontal.

Figure 3:
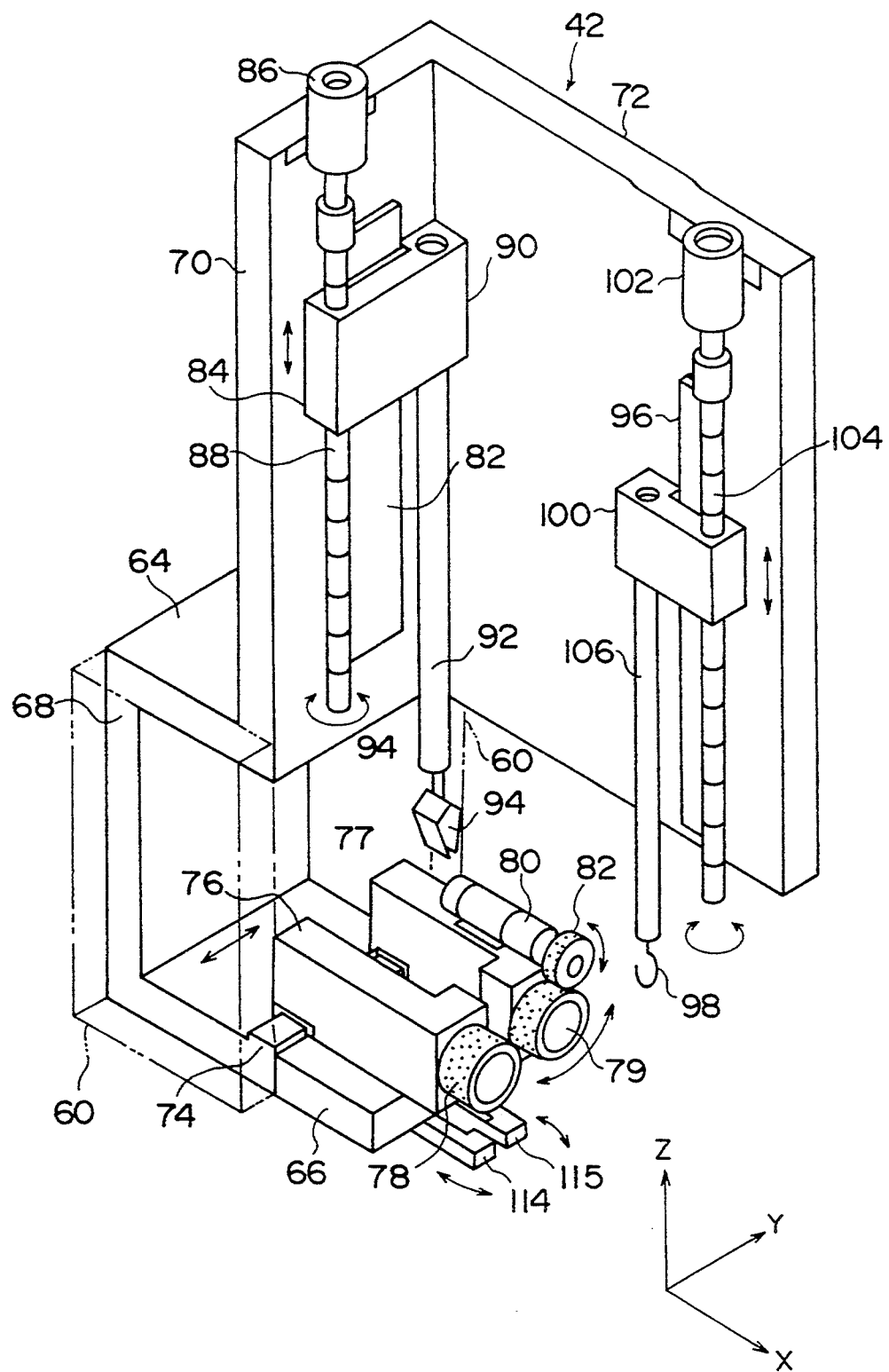
FIG. 3 is a perspective view showing details of a forth base of a switching robot used in the switching apparatus in FIG. 2.

FIG. 3 is a perspective view showing the fourth base 42 in the upright position. Referring to FIG. 3, the side plates 60 are indicated by chain double-dashed lines for clearness. In the state shown in FIG. 3, the fourth base 42 is constituted by a pair of the side plates 60, a pair of upper and lower plates 64 and 66 coupling these side plates 60 and arranged with a predetermined spacing between them in the Z direction, a plate 68 coupling the rear end portions of these plates 64 and 66, a plate 70 extending from the front end portion of the upper plate 64 in the Z direction, and a plate 72 extending forward, i.e., in the direction of the arrow X from one side edge portion of the plate 70.

A guide rail 74 extending in the Y direction is formed on the upper surface of the lower plate 66. A pair of support blocks 76 and 77 are so mounted on the plate 66 as to be movable horizontally along the guide rail 74. A driving mechanism (not shown) is connected to the support blocks 76 and 77, so the spacing between the support blocks 76 and 77 can be changed by controlling this driving mechanism. The front end portions of the support blocks 76 and 77 project forward farther than the front edge portion of the plate 66, and rollers 78 and 79 preferably consisting of rubber are supported at the end faces of the front end portions of the support blocks 76 and 77, respectively. These rollers 78 and 79 are brought into contact with each other when the spacing between the support blocks 76 and 77 is minimized. In addition, the roller 79 is rotated by a friction roller 82 of a motor 80 fixed to the support block 77.

Referring to FIG. 3, a guide rail 82 extending in the Z direction is formed on the front surface of the plate 70. A hand unit 84 is so mounted on the plate 70 as to be movable along the guide rail 82. In this embodiment, the hand unit 84 primarily consists of a unit box 90, a support pipe 92, and a pair of gripper members 94 supported at the lower end of this support pipe 92. The unit box 90 can be moved along the guide rail 82 by a feed screw 88 which is rotated by a motor 86. The support pipe 92 is attached to the unit box 90 and extends to a portion between the support blocks 76 and 77 along the moving direction of the unit box 90. The gripper members 94 are opened/closed by controlling a proper driving mechanism (not shown) provided in the unit box 90, and can therefore grip the connector plug 28 of the second optical fiber 16.

A guide rail 96 extending in the Z direction is also formed on the right-hand surface (opposite to the direction of the arrow Y in FIG. 3) of the plate 72. A support block 100 for supporting a hook 98 is so mounted as to be movable along the guide rail 96. This support block 100 is moved along the guide rail 96 by a feed screw 104 which is rotated by a motor 102. A support rod 106 extends from the support block 100 in the moving direction of the support block 100. The hook 98 at the lower end of the support rod 106 is located so that it can pass in front of the space between the support blocks 76 and 77.

Figure 4:
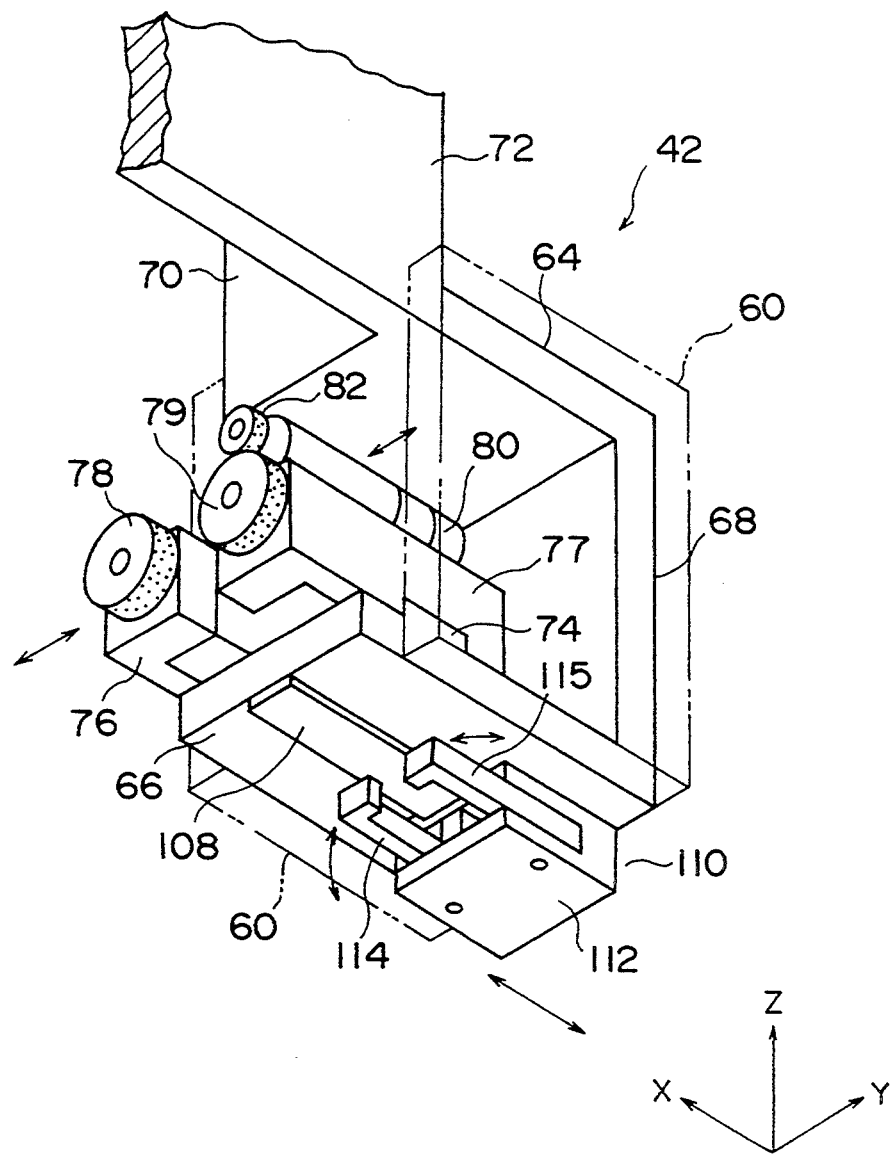
FIG. 4 is a perspective view showing the fourth base when viewed upward.

In addition, as clearly illustrated in FIG. 4, a guide rail 108 extending in the X direction is formed on the lower surface of the lower plate 66. A gripper unit 110 is slidably mounted on this guide rail 108. This gripper unit 110 comprises a unit box 112 and a pair of gripper members 114 and 115. The unit box 112 is moved along the guide rail 108 by an appropriate driving mechanism (not shown). The gripper members 114 and 115 are opened/closed by a driving mechanism (not shown) provided in the unit box 112. When the gripper unit 110 is moved to the frontmost position, the tips of the gripper members 114 and 115 project forward farther than the front edge portion of the plate 66 and are positioned immediately below the rollers 78 and 79. The gripper members 114 and 115 are located at the position as in FIG. 4 when the gripper unit 110 is moved backward.

Figure 5:
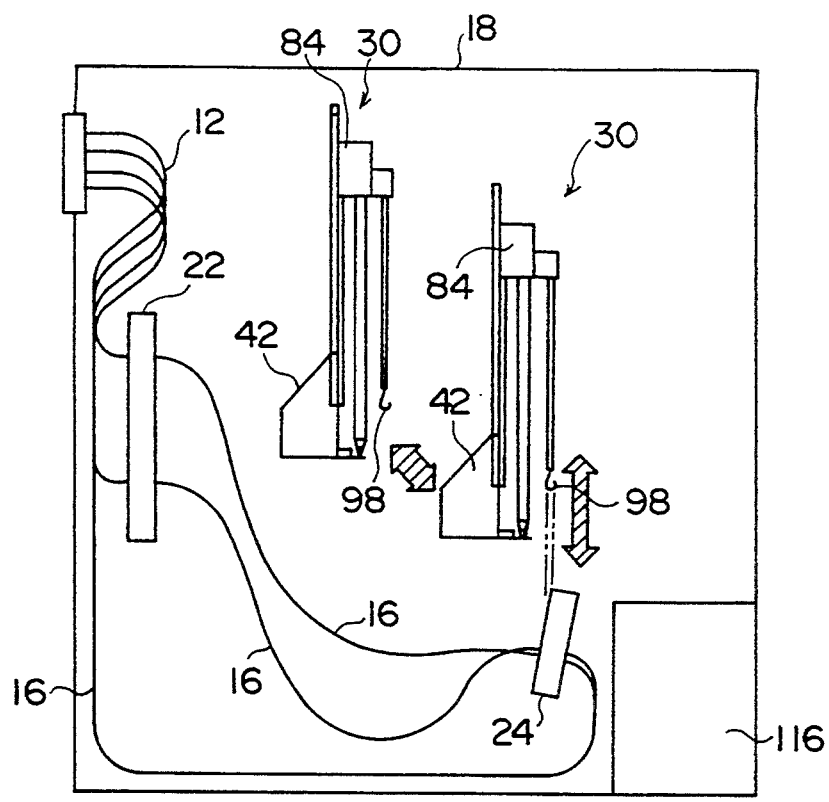
FIG. 5 is a schematic view for explaining the operation of the switching apparatus in FIG. 2, in which the fourth base in an upright position is illustrated.

An operation of switching the connections of two second optical fibers 16 by using the transmission line switching apparatus with the above arrangement will be described below. The switching robot 30 of this transmission line switching apparatus can be remotely operated by an operator. However, as shown in FIGS. 5 and 6, it is preferable to provide a controller 116 constituted by a microcomputer or the like, so that the switching robot 30 is driven automatically by inputting information of the second optical fibers 16 to be switched, their switching positions to this controller 116, and the like.

To begin, an operator performs a predetermined input operation for the controller 116. The memory in the controller 116 stores the information that the connector plug 28 of each of the second optical fiber 16 is connected to which of the connector adapters 26, i.e., which of the first optical fibers 12. Therefore, when the two second optical fibers 16 to be switched are designated, the controller 116 starts a step of detaching the connector plug 28 of one of the designated second optical fibers 16 from the optical fiber connecting board 22, on the basis of the data stored in the memory.

Figure 6:
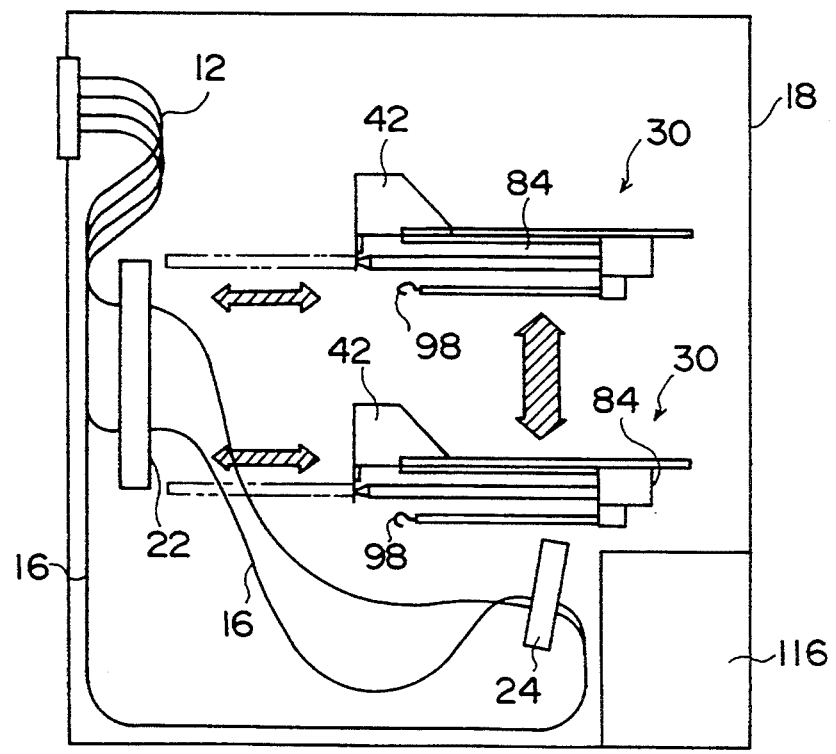
FIG. 6 is a schematic view for explaining the operation of the switching apparatus in FIG. 2, in which the fourth base in a lateral position is illustrated.

In this detaching step, the motor 62 is first driven to tilt the fourth base 42 from the upright position (see FIG. 5), as the initial state, to the lateral position (see FIG. 6). Subsequently, the motors connected to the feed screws 48, 52, and 56 are driven to move the first, second, and third bases 36, 38, and 40, respectively, thereby positioning the hand unit 84 between the optical fiber connecting board 22 and the optical fiber arranging board 24. At the same time, the position is so adjusted that the axis of the support pipe 92 of the hand unit 84 becomes coaxial with the axis of the connector plug 28 to be detached. In this state, there is a difference between the levels of the optical fiber connecting board 22 and the optical fiber arranging board 24, and the portions of the second optical fibers 16 which are bridged between the optical fiber connecting board 22 and the optical fiber arranging board 24 is of a substantially U shape. Therefore, the switching robot 30 can be moved relatively freely between the boards 22, 24, as is understood from FIGS. 5 and 6.

Thereafter, the motor 86 of the hand unit 84 is driven to move the hand unit 84 toward the optical fiber connecting board 22 along the guide rail 82. Consequently, the gripper members 94 of the hand unit 84 move closer to the designated connector plug 28. Thereafter, the connector plug 28 is gripped between the gripper members 94 by opening/closing the gripper members 94 by controlling the driving mechanism incorporated in the unit box 90. When the connector plug 28 is gripped, the motor 86 is reversely rotated to move the hand unit 84 away from the optical fiber connecting board 22, thereby pulling the connector plug 28 out of the connector adapter 26. After the detachment of the connector plug 28 is completed, the gripper members 94 are opened and the connector plug 28 is fallen.

The switching robot 30 with empty hands is then returned to the initial position. Thereafter, the above procedure is again performed to detach the connector plug 28 of the another second optical fiber 16 from the optical fiber connecting board 22.

When the above detaching step is completed, the controller 116 starts a step of pulling up the connector plugs 28 of the second optical fibers 16 detached from the optical fiber connecting board 22. At this point, the connector plugs 28 of the second optical fibers 16 to be switched are detached from the optical fiber connecting board 22 and left placed on the bottom plate of the casing 18. Therefore, the pulling-up step is performed to pull the connector plug 28 upward to separate it from the bundle of the other second optical fibers 16, thereby releasing the entangled state.

The memory in the controller 116 stores information of the detached second optical fibers 16 and the positions of the through holes of the optical fiber arranging board 24 through which these second optical fibers 16 pass. In the pulling-up step, therefore, the motors of the feed screws 48, 52, and 56 are controlled on the basis of the stored data of the memory to move the first, second, and third bases 36, 38, and 40, respectively, of the switching robot 30, Consequently, the hook 98 provided on the fourth base 42 in the standing state is positioned right above a portion near the exit (the opening on the side of the optical fiber connecting board 22) of the through hole associated with the second optical fiber 16 to be switched. Thereafter, the motor 102 is driven to vertically move the hook 98 downward, thereby locating the lower curved portion of the hook 98 below the second optical fiber 16 in the vicinity of the exit of the through hole. In this case, since the optical fiber arranging board 24 is inclined, the other second optical fibers 16 and the hook 98 do not interfere with each other.

Figure 7:
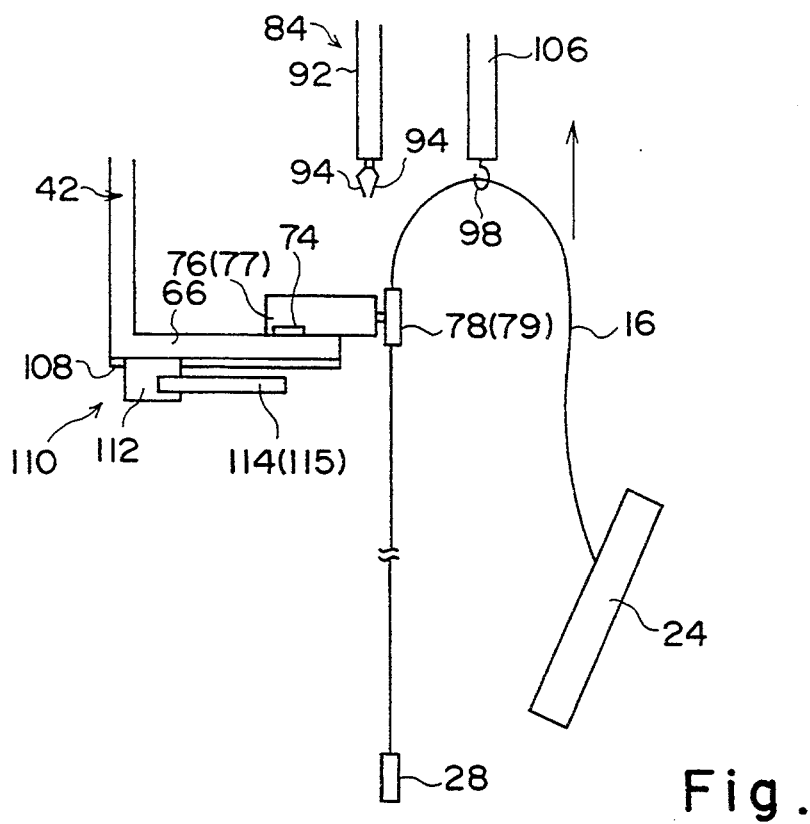
FIG. 7 is a view for explaining the operation of the switching robot, in which the robot is suspending an optical fiber by using a hook.
Figure 8:
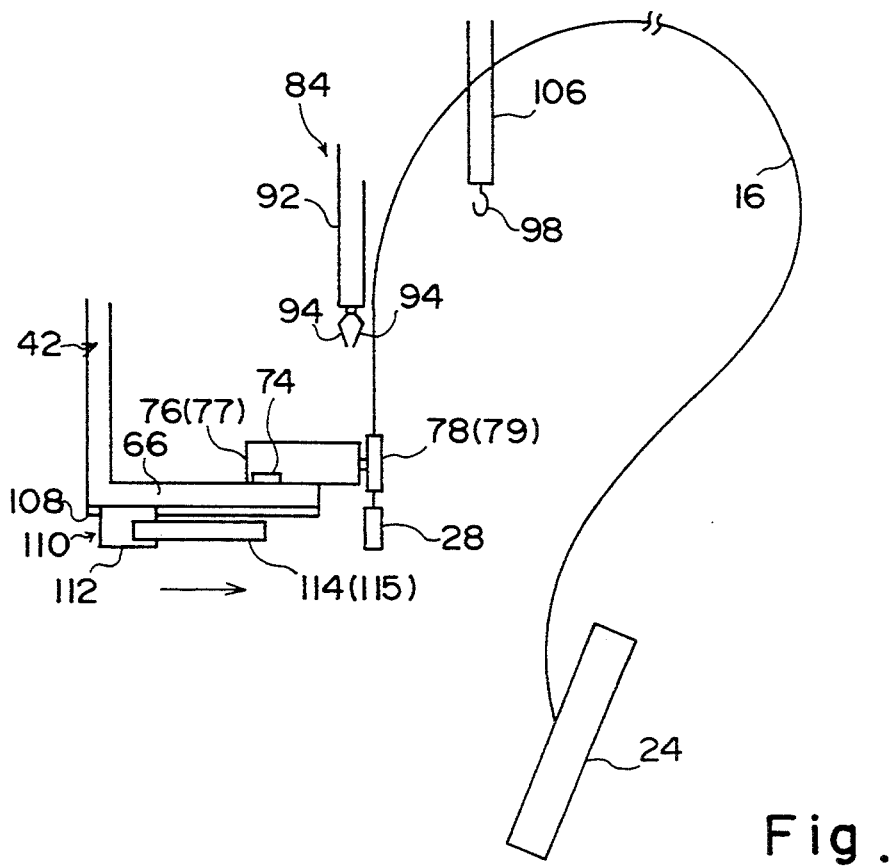
FIG. 8 is a view for explaining the operation of the switching robot, in which the robot is pulling up the optical fiber by using rollers.

The motor 102 is then reversely rotated to vertically move the hook 98 upward. Consequently, the second optical fiber 16 to be switched is hooked by the hook 98 and raised together with the hook 98. As the hook 98 is raised, a portion of the second optical fiber 16 vertically suspended from the hook 98 is positioned between the rollers 78 and 79 (see FIG. 7). When this state is reached, the spacing between the support blocks 76 and 77 is narrowed to clamp the hooked optical fiber 16 between the rollers 78 and 79. Thereafter, the motor 80 is driven to rotate the rollers 78 and 79. Consequently, the second optical fiber 16 is pulled up, and the connector plug 28 at the distal end of that fiber 16 is also pulled up through the bundle of the other second optical fibers 16 (see FIG. 8). In this case, the connector plug 28 can also be pulled up by only raising the hook 98. However, this extremely elongates the stroke of the vertical motion of the hook 98, resulting in an increased size of the apparatus as a whole. In contrast, when the rollers 78 and 79 for this pulling-up step are provided as in this embodiment, the stroke of the hook 98 can be short. This advantageously makes miniaturization of the apparatus feasible. In addition, the second optical fiber 16 to be switched is pulled out from the bundle of the other second optical fibers 16 whenever switching is performed, thereby temporarily releasing the entangled state. This prevents the entangled state of the second optical fibers 16 from being complicated and knotted even if the switching is repeatedly performed.

Figure 9:
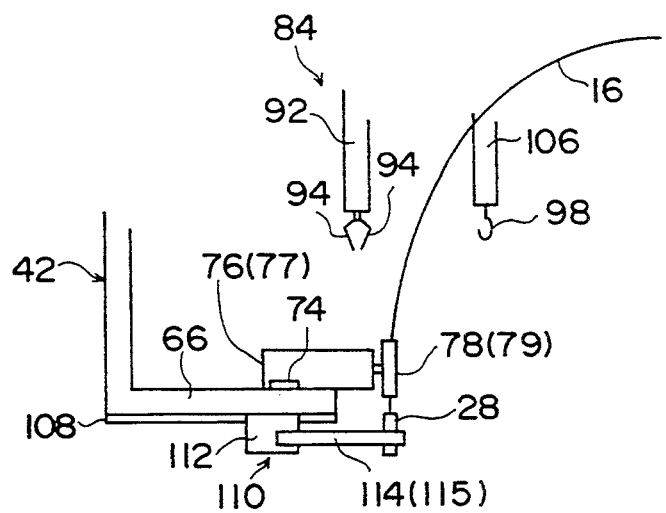
FIG. 9 is a view for explaining the operation of the switching robot, in which a step of transferring the connector plug of the optical fiber to a gripper unit is illustrated.
Figure 10:
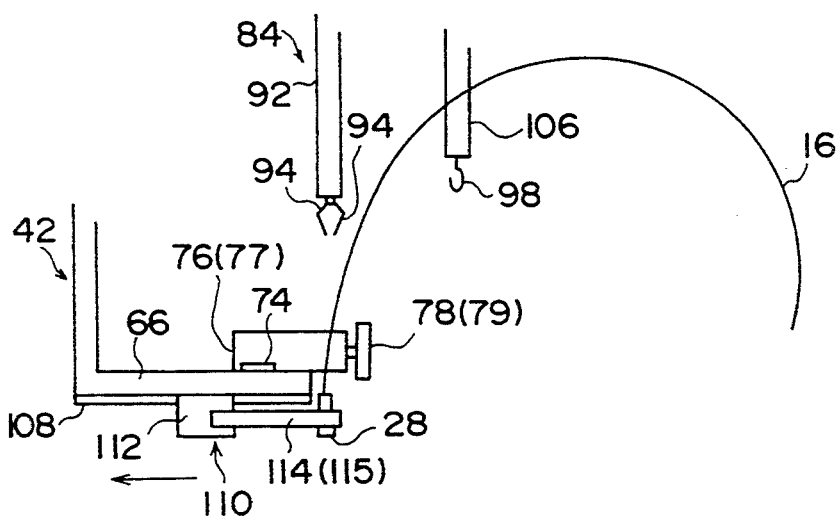
FIG. 10 is a view for explaining the operation of the switching robot, in which the state before the connector plug is transferred from the gripper unit to a hand unit is illustrated.

When the connector plug 28 is located at a position between and immediately below the rollers 78 and 79, the controller 116 starts a step of transferring this connector plug 28 to the gripper members 94 of the hand unit 84. In this transferring step, the gripper unit 110 on the lower surface of the plate 66 of the fourth base 42 is first driven so that the gripper members 114 and 115 can be located at the position between and immediately below the rollers 78 and 79, and the connector plug 28 is gripped between the gripper members 114 and 115 (see FIG. 9). Subsequently, the support blocks 76 and 77 are returned to the home position to widen the spacing between them, thereby releasing the second optical fiber 16 from the clamped state by the rollers 78 and 79. Thereafter, the gripper unit 110 is slightly moved backward to locate the connector plug 28, which is gripped by the gripper members 114 and 115, immediately below the gripper members 94 of the hand unit 84 (see FIG. 10).

Figure 11:
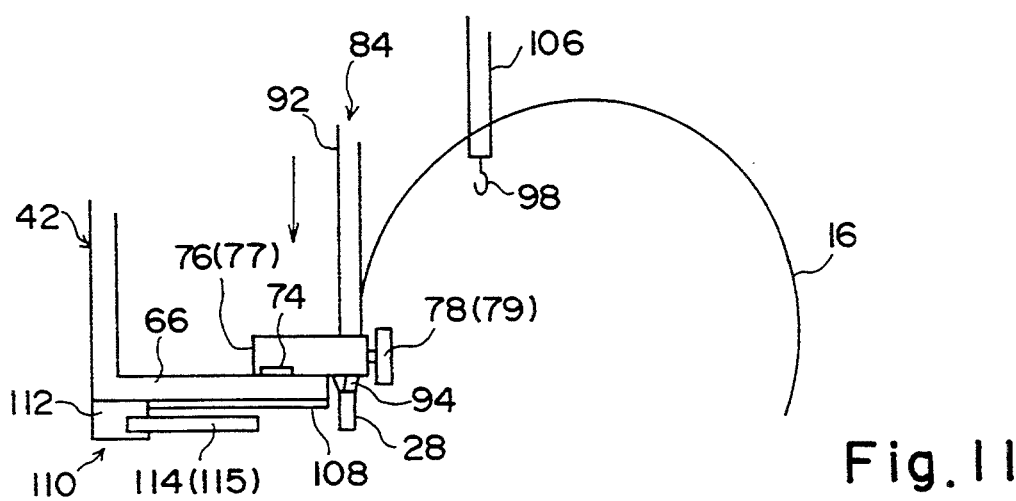
FIG. 11 is a view for explaining the operation of the switching robot, in which the connector plug is gripped by the hand unit.

When the connector plug 28 is positioned immediately below the gripper members 94 of the hand unit 84, the controller 116 drives the motor 86 to vertically move the hand unit 84 downward, and at the same time controls the opening/closing of the gripper members 94, thereby allowing the gripper members 94 to grip the connector plug 28. When the connector plug 28 is gripped by the gripper members 94 of the hand unit 84 in this way, the controller 116 controls the gripper unit 110 to release the connector plug 28 from the gripped state by the gripper members 114 and 115 of the gripper unit 110, and also retracts the entire gripper unit 110 to the home position (see FIG. 11).

After the connector plug 28 is transferred to the gripper members 94 of the hand unit 84, the controller 116 starts a step of again connecting the connector plug 28 to the optical fiber connecting board 22. In this step, the connector plug 28 gripped by the gripper members 94 is inserted into the connector adapter 26 to which the another connector plug 28 was connected.

In the connecting step, the motor 62 is first driven to tilt the fourth base 42 from the upright position to the lateral position, and the positions of the first, second, and third bases 36, 38, and 40 of the switching robot 30 are so adjusted that the predetermined connector adapter 26 of the optical fiber connecting board 22 and the support pipe 92 of the hand unit 84 become coaxial. Thereafter, the motor 86 of the hand unit 84 is driven to move the hand unit 84 closer to the optical fiber connecting board 22. Consequently, the connector plug 28 gripped by the gripper members 94 is inserted into the connector adapter 26, optically connecting the first optical fiber 12 associated with the connector plug in that connector adapter 26 to the second optical fiber 16. Lastly, the gripper members 94 are opened, and the switching robot 30 is returned to the initial position, thereby completing the switching operation for one of the second optical fibers 16. The switching operation for the another second optical fiber 16 is performed by executing the pulling, transferring, and connecting steps in the same manner as mentioned above.

The procedure of switching the two second optical fibers 16 using the transmission line switching apparatus according to the first embodiment has been described above. It will be readily understood that switching between three or more second optical fibers 16 can be similarly executed. It is also possible to detach all of the second optical fibers 16 from the optical fiber connecting board 22 and then insert them into the connector adapters 26 one by one.

Figure 12:
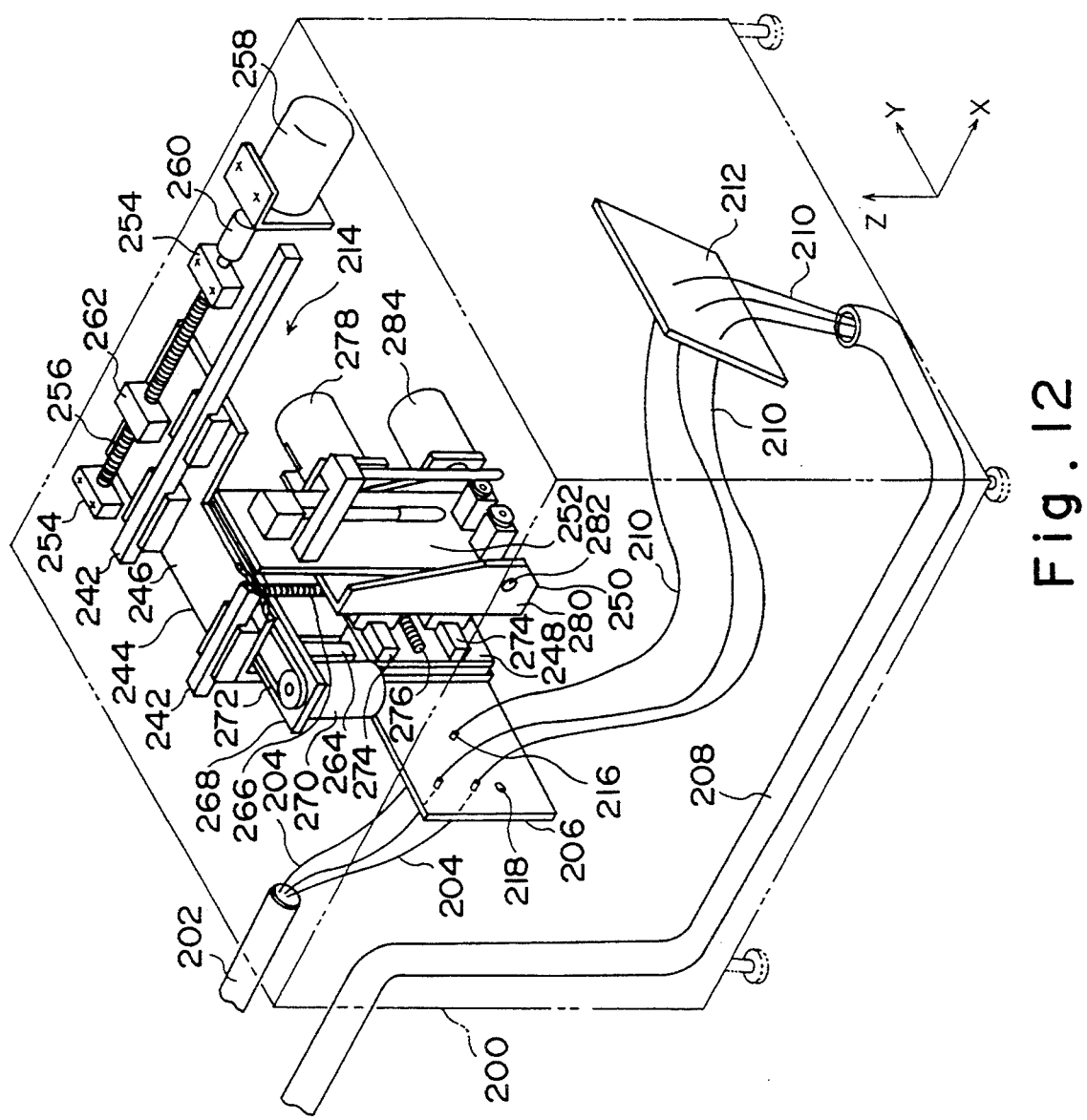
FIG. 12 is a perspective view showing the switching apparatus of the second embodiment of the present invention.

FIG. 12 shows a transmission line switching apparatus according to the second embodiment of the present invention. As in the above first embodiment, this transmission line switching apparatus basically comprises a casing 200, an optical fiber connecting board 206, an optical fiber arranging board 212, and a switching robot 214. The optical fiber connecting board 206 is arranged in the casing 200 and fixes the end portions of a plurality of first optical fibers 204 of a first optical fiber cable 202. The optical fiber arranging board 212 is arranged apart from the optical fiber connecting board 206 with a predetermined spacing between them and holds a plurality of second optical fibers 210 of a second optical fiber cable 208. The switching robot 214 for handling the second optical fibers can move three-dimensionally between the optical fiber connecting board 206 and the optical fiber arranging board 212.

Figure 13:
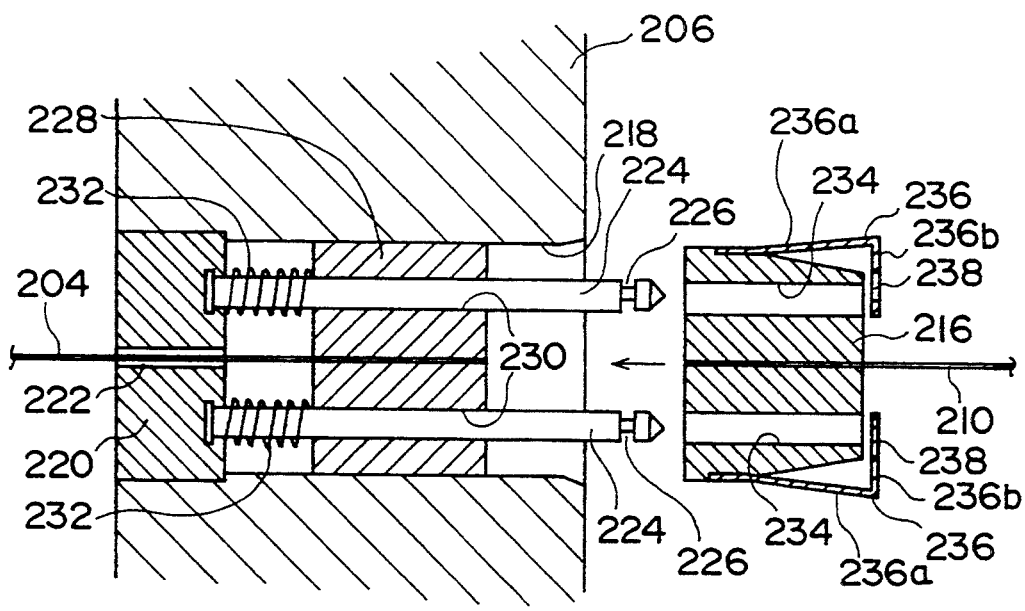
FIG. 13 is a horizontal sectional view showing a connector structure used in the switching apparatus in FIG. 12, in which the state before connection is illustrated.
Figure 14:
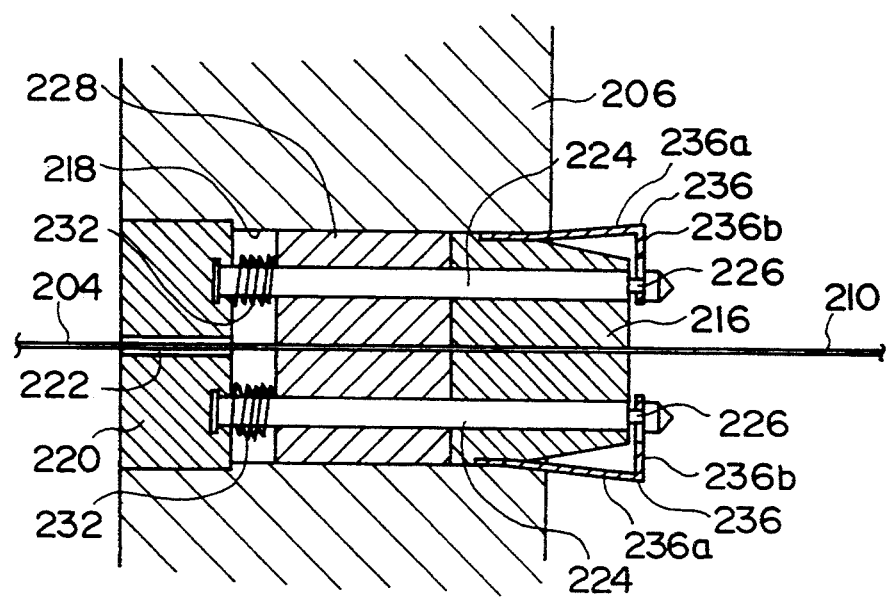
FIG. 14 is a horizontal sectional view showing the connector structure used in the switching apparatus in FIG. 12, in which the state after connection is illustrated.

In this embodiment, a connector plug 216 of each second optical fiber 210 is not removed easily from the optical fiber connecting board 206. More specifically, the optical fiber connecting board 206 is mounted substantially vertically in the casing 200 by an appropriate mounting member (not shown), and a plurality of through holes 218 are formed in a matrix form in the optical fiber connecting board 206. Each through hole 218 has a rectangular sectional shape. As is clearly shown in FIGS. 13 and 14, a closing member 220 is fitted in each through hole 218 from the rear surface-side of the optical fiber connecting board 206, i.e., from the side away from the side opposing the optical fiber arranging board 212. Each closing member 220 has a perforation 222 formed at the center thereof through which the first optical fiber 204 is passed. A pair of guide pins 224 extend from the closing member 220 such that the perforation 222 is located between the ends on one side of the guide pins 224. The guide pins 224 extend toward the optical fiber arranging board 212 along the axis in the longitudinal direction of the through hole 218. The other end of each guide pin 224 projects toward the optical fiber arranging board 212 farther than the front surface of the optical fiber connecting board 206, and an annular groove 226 is formed in the circumferential surface of each projecting portion. Preferably, the tip of each guide pin 224 is of a tapered or conical shape.

The distal end of each first optical fiber 204 extending from the rear surface side of the optical fiber connecting board 212 through the perforation 222 of the closing member 220 is held by a first ferrule 228 as a connector plug arranged inside each through hole 218. The sectional shape of this first ferrule 228 is substantially identical to that of the through hole 218. Therefore, the first ferrule 228 can slide in the through hole 218 along the axis in the longitudinal direction (X direction). The first ferrule 228 has guide holes 230 perforated therein, through which the guide pins 224 are slidably inserted.

A coil spring 232 is wound on a portion of each guide pin 224 between the closing member 220 and the first ferrule 228. The coil springs 232 bias the first ferrule 228 toward the optical fiber arranging board 212 at any instant.

A second ferrule as the connector plug 216 is attached on the distal end of each second optical fiber 210 extending through and from the optical fiber arranging board 212 toward the optical fiber connecting board 206. This second ferrule 216 has essentially the same sectional shape as that of the through holes 218 of the optical fiber connecting board 206. In addition, guide holes 234 through which the guide pins 224 are inserted are formed in the second ferrule 216. Therefore, the second ferrule 216 inserted into the through hole 218 is guided by the inner surface of the through hole 218 and the guide pins 224. Consequently, the end faces of the first and second ferrules 228 and 216 are brought into contact with each other without causing any lateral positional deviation. In this state in which these end faces are in contact with each other, the second optical fiber 210 held by the second ferrule 216 is optically connected to the first optical fiber 204 held by the first ferrule 228.

Figure 15:
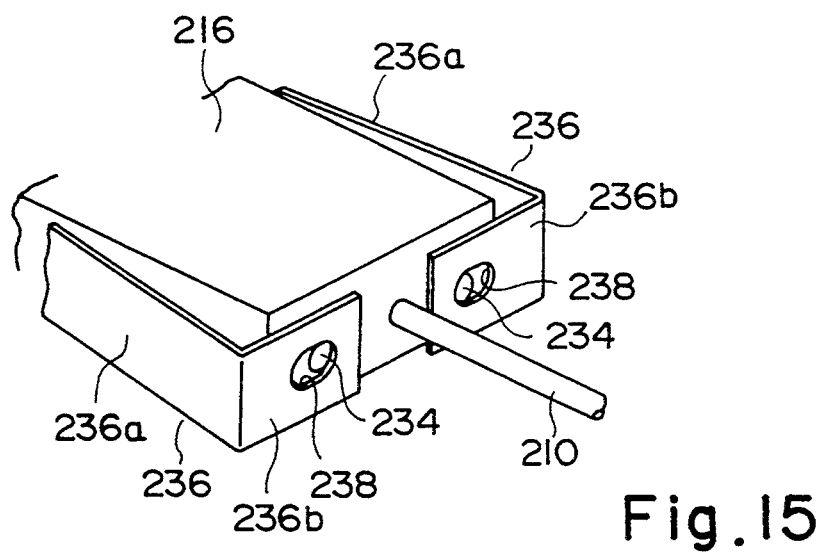
FIG. 15 is a perspective view showing a portion of a second ferrule illustrated in FIGS. 13 and 14.

The second ferrule 216 also includes two locking leaf springs 236 which allow the second ferrule 216 to be locked inside the through hole 218 while the second ferrule 216 is in contact with the first ferrule 228. As is also apparent from FIG. 15, each locking leaf spring 236 is a member bent into a substantially L shape along one side surface and the rear end face (opposite to the contact end face) of the second ferrule 216. The locking leaf spring 236 consists of a spring portion 236a and a lock portion 236b. With its proximal end portion fixed to one side surface of the second ferrule 216, the spring portion 236a is gradually separated away from the side surface as it extends toward the rear end face. The lock portion 236b is bent from the spring portion 236a along the read end face and opposes the opening of the guide hole 234. As clearly illustrated in FIG. 16, a lock hole 238 of the size by which the distal end of the guide pin 224 can be inserted is formed in the lock portion 236b. With no load applied on the spring portion 236a, a portion of the periphery of the lock hole 238 closes a portion of the opening of the guide hole 234. However, when the spring portion 236a is pushed toward the side surface of the second ferrule 216, the opening of the lock hole 238 entirely overlaps the opening of the guide hole 234, thereby completely opening the guide hole 234.

To couple the second ferrule 216 with the above arrangement to the first ferrule 228, first, the spring portions 236a of a pair of the locking leaf springs 236 are pressed to deform toward the side surfaces of the second ferrule 216, and then the guide pins 224 extending from the through hole 218 are inserted into the corresponding guide holes 234 of the second ferrule 216. As the second ferrule 216 is inserted into the through hole 218 of the optical fiber connecting board 206, the second ferrule 216 abuts against the first ferrule 228. As the second ferrule 216 is further inserted, the first ferrule 228 moves backward since the coil springs 232 are compressed. Finally, the annular grooves 226 at the distal ends of the guide pins 224 project from the rear end face of the second ferrule 216. In this state, by releasing the locking leaf springs 236 from the pressed state to the original state, the edges of the lock holes 238 of the locking leaf springs 236 are fitted in the grooves 226 of the guide pins 224. Consequently, the second ferrule 216 is locked to the guide pins 224, i.e., to the optical fiber connecting board 206. In this locked state, the end face of the first ferrule 228 is urged against the end face of the second ferrule 216 by the biasing force of the coil springs 232, so that the first optical fiber 202 and the second optical fiber 210 are optically connected.

To remove the second ferrule 216 from the optical fiber connecting board 206, by pressing the spring portions 236a of the locking leaf springs 236 to deform the springs toward the side surfaces of the second ferrule 216, the edges of the lock holes 238 of the leaf springs 236 are separated from the grooves 226 of the guide pins 224 to release the locked state. In this state, therefore, it is only necessary to pull the second ferrule 216 out from the through hole 218.

Figure 16:
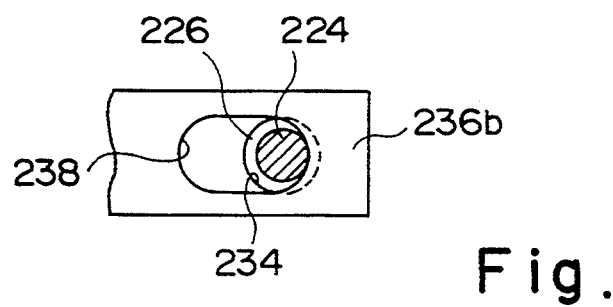
FIG. 16 is a partial view showing the relationship between a locking leaf spring of the second ferrule and a guide pin.
Figure 17:
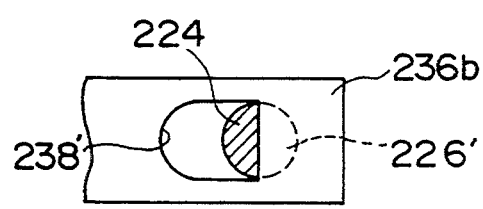
FIG. 17 is a partial view showing a modification of the locking leaf spring of the second ferrule and the guide pin.
Figure 18:
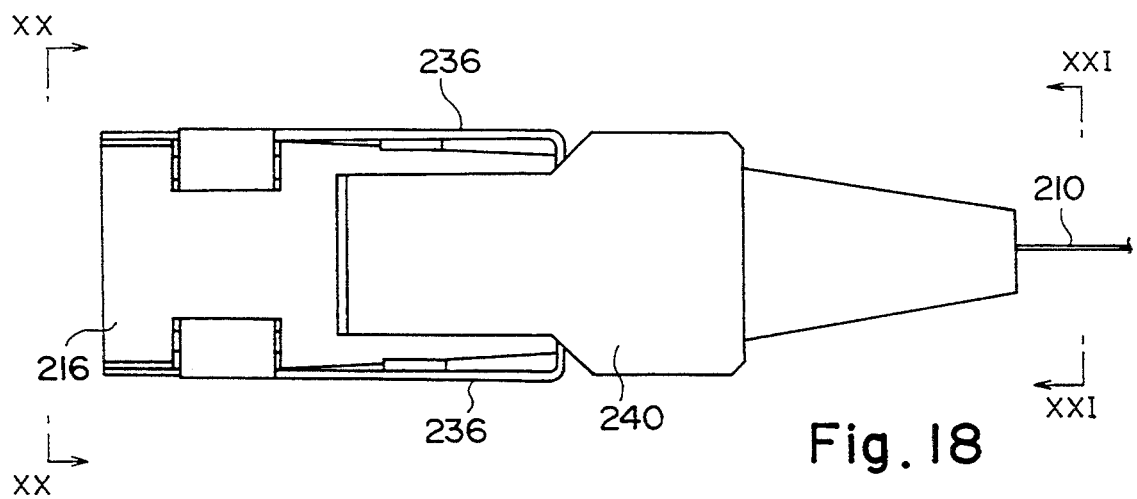
FIG. 18 is a plan view showing the state in which a protective boot is attached to the second ferrule.
Figure 19:
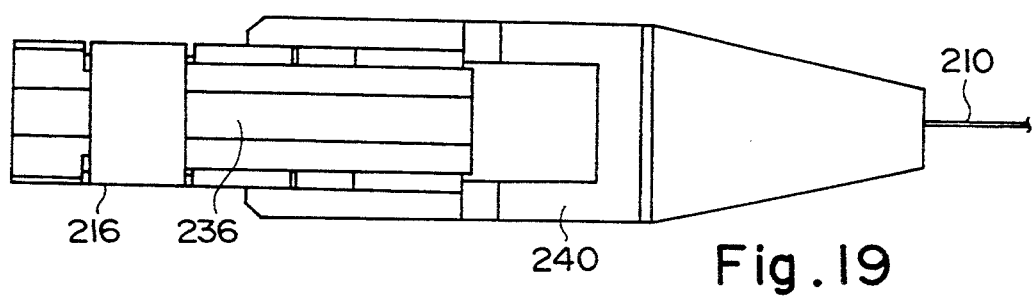
FIG. 19 is a side view showing the second ferrule in FIG. 18.
Figure 20:
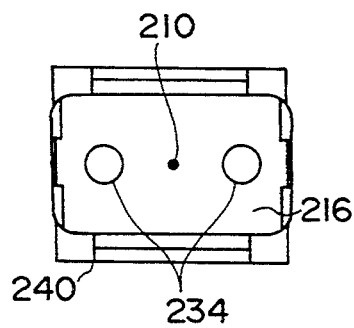
FIG. 20 is a sectional view taken along the line XX—XX in FIG. 18.
Figure 21:
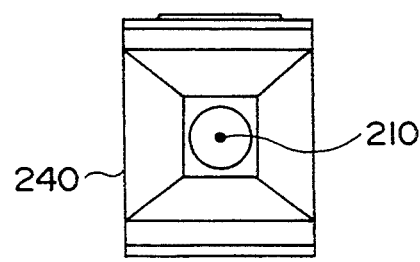
FIG. 21 is a sectional view taken along the line XXI—XXI in FIG. 18.

Note that each lock hole 238 need not be an elongated hole as in FIG. 16 but may take another shape, e.g., a circle. In addition, as illustrated in FIG. 17, the groove of each guide pin 224 can be a semi-circular groove 226'. In this case, the edge of a lock hole 238' to be engaged with this groove 226' is formed straight.

The optical fiber arranging board 212 for holding the second optical fibers 210 is essentially identical to that of the first embodiment. That is, a plurality of through holes through which the second optical fibers 210 are inserted are formed in a matrix form in the optical fiber arranging board 212. In addition, this optical fiber arranging board 212 is located at a position lower than the optical fiber connecting board 206 and inclined from the vertical plane by an angle of about 5° to about 10°. When the plurality of second optical fibers 210 extending from the optical fiber arranging board 212 are inserted into and locked to their respective predetermined through holes 218 of the optical fiber connecting board 206, these optical fibers 210 are loosened (with a deflection of about 30%) and entangled with each other between the optical fiber connecting board 206 and the optical fiber arranging board 212.

As shown in FIGS. 18 to 21, it is preferable to attach a protective boot 240 to the rear portion of each second ferrule 216. This protective boot 240 gradually contracts as it extends away from the second ferrule 216. This shape can prevent inconveniences that, e.g., in the step of pulling one of the second optical fibers 210 up, the second ferrule 216 of that fiber is caught by the other second optical fibers 210.

Since the second ferrule 216 has the function of preventing removal from the optical fiber board 206 as discussed above, the arrangement of the switching robot 214 for handling these second ferrules 216 also differs from that of the first embodiment.

As illustrated in FIG. 12, the switching robot 214 of this second embodiment includes a robot main body 244 which can slide along a pair of guide rails 242 arranged on the lower surface of the top plate of the casing 200 and extending in the X direction. As in the first embodiment, this robot main body 244 includes first, second, third, and fourth bases 246, 248, 250 and 252. The first base 246 is supported on the guide rails 242 and can be reciprocated in the X direction. The second base 248 is supported on the first base 246 and can be reciprocated in the Z direction. The third base 250 is supported on the second base 248 and can be reciprocated in the Y direction. The fourth base 252 is supported on the third base 250 and can pivot about an axis parallel to the Y direction.

The first base 246 is constituted by a horizontal portion slidably mounted on the guide rails 242, and a pair of vertical portions vertically bent downward from the both end portions of the rear edge of the horizontal portion. This first base 246 is so mounted on the guide rails 242 that the space between the vertical portions opposes the optical fiber connecting board 206. A feed screw 256 of a ball screw mechanism is rotatably supported on the lower surface of the top plate of the casing 200 by bearing members 254. The feed screw 256 extends in the X direction, and its one end is connected, through an appropriate transmission mechanism 260, to the rotating shaft of a motor, preferably a DC servo motor 258 with a brake, fixed to the top plate. A nut member 262 is engaged with the feed screw 256. This nut member 262 is fixed to the horizontal portion of the first base 246. Therefore, the first base 246 is moved along the guide rails 242 by rotating the feed screw 256 by controlling the motor 258.

A guide rail 264 extending in the Z direction is formed on the front surface (facing in the direction of an arrow X in FIG. 12) of each vertical portion of the first base 246. The second base 248 is so mounted between the vertical portions as to be vertically movable along this guide rail 264. A feed screw 266 of a ball screw mechanism for driving the second base 248 is rotatably supported at an appropriate position of the first base 246 and extends in the Z direction. A nut member (not shown) fixed to the second base 248 is engaged with this feed screw 266. The torque of a motor, preferably a DC servo motor 270 with a brake, supported by a support bracket 268 on the first base 246 is transmitted to the feed screw 266 via a belt transmission mechanism 272. Therefore, by controlling the motor 270, the second base 248 can be vertically moved along the guide rail 264 of the first base 246.

A pair of upper and lower guide rails 274 extending in the Y direction are formed on the front surface of the second base 248. The third base 250 is so mounted on the second base 248 as to be movable along these guide rails 274. The third base 250 can also be moved along the guide rails 274 of the second base 248 by rotating a feed screw 276, which is rotatably supported on the second base 248 and extends in the Y direction, by using a motor, preferably a DC servo motor 278 with a brake.

Both the side edge portions of the third base 250 are bent in the direction of the arrow X in FIG. 12, forming support portions 280 for supporting the fourth base 252. Through holes are formed in the lower portions of these support portions 280, and support shafts 282 on the outer surfaces of the side plates of the fourth base 252 are fitted in these through holes. Therefore, the fourth base 252 can pivot about the support shafts 282 on the X-Z plane. One of the support shafts 282 is coupled directly to the rotating shaft of a motor, preferably a DC servo motor 284 With a brake, fixed to the third base 250. By controlling the motor 284, therefore, the fourth base 252 can be tilted between an upright position in which it is vertical and a lateral position in which it is horizontal.

Figure 22:
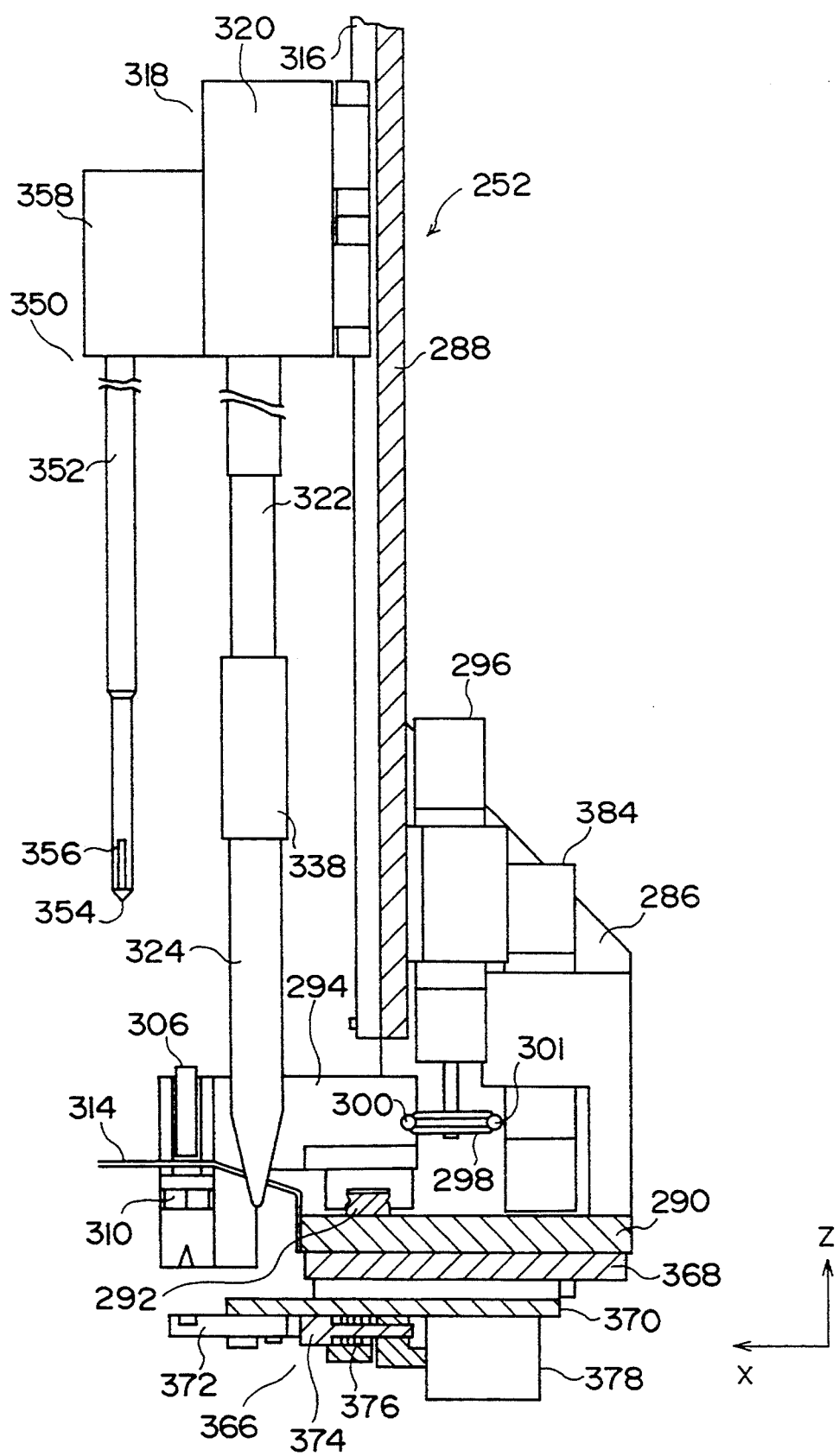
FIG. 22 is a side view showing a fourth base of a switching robot used in the switching apparatus in FIG. 12.
Figure 23:
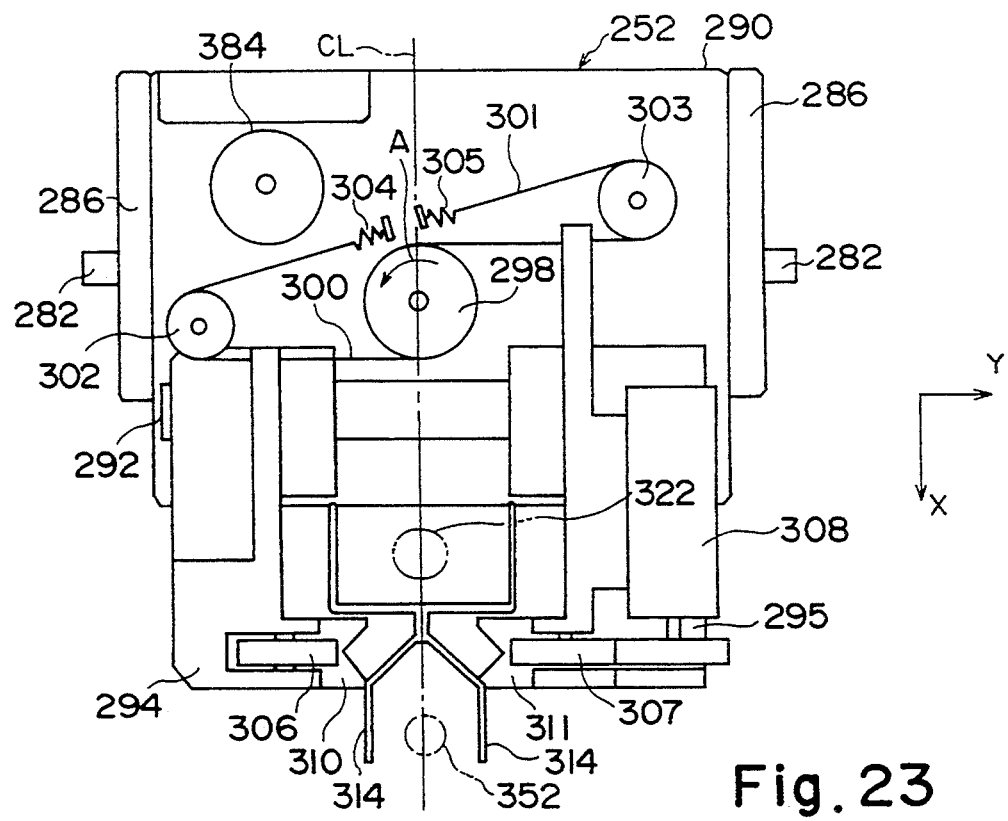
FIG. 23 is a plan view schematically showing the arrangement of the lower portion of the fourth base.
Figure 24:
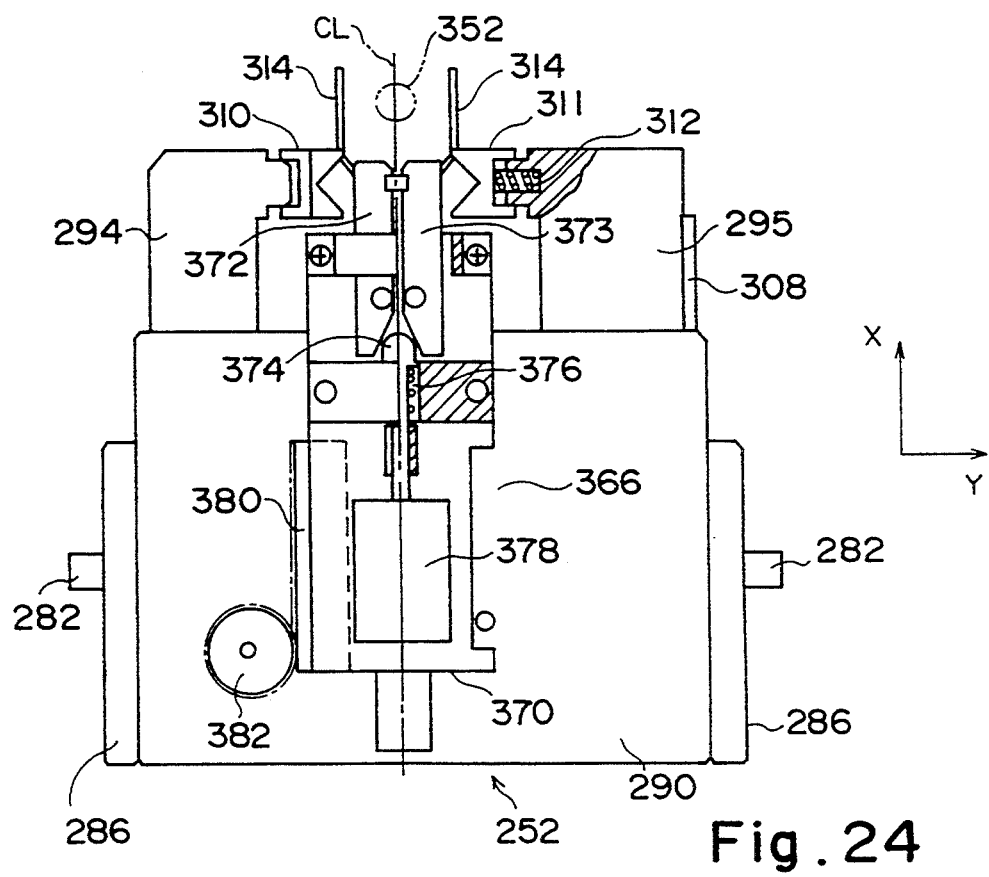
FIG. 24 is a bottom view of the fourth base.

FIG. 22 is a longitudinal sectional view showing the fourth base 252 in the upright position. FIG. 23 is a plan view schematically showing the arrangement of the lower portion of the fourth base 252. FIG. 24 is a bottom view of the fourth base 252. In the state illustrated in FIG. 22, the fourth base 252 includes a plate 288 provided between a pair of side plates 286 and extending vertically, and a plate 290 horizontally provided between the lower portions of the side plates 286.

On the upper surface of this plate 290, a guide rail 292 extending in the lateral direction, i.e., the Y direction is formed, and a pair of support blocks 294 and 295 are so mounted as to be movable horizontally along this guide rail 292. A driving mechanism is connected to these support blocks 294 and 295. Therefore, the spacing between the support blocks 294 and 295 can be changed by controlling this driving mechanism. In this embodiment, the driving mechanism includes a motor 296 vertically mounted on the rear surface of the plate 288, and a pulley 298 attached to the lower end of the rotating shaft of the motor 296. The ends on one side of pulling wires 300 and 301 are fixed to two positions of the circumferential groove of the pulley 298. The pulling wires 300 and 301 are fixed to the rear portions of the support blocks 294 and 295, respectively, through these rear portions. The other end of each of the pulling wires 300 and 301 is connected, via a corresponding one of pulleys 302 and 303, to a corresponding one of tension springs 304 and 305 attached to the plate 290. FIG. 23 illustrates the state in which the support blocks 294 and 295 are separated farthest from each other. When the motor 296 is driven to rotate the pulley 298 in the direction of an arrow A in this state, the pulling wires 300 and 301 are taken up by the pulley 298 against the biasing force of the tension springs 304 and 305. Accordingly, the support blocks 294 and 295 slide closer to each other. Thereafter, by reversely rotating the motor 296, the pulling wires 300 and 301 are released from the pulley 293 by the returning force of the tension springs 304 and 305, respectively. Consequently, the support blocks 294 and 295 slide in opposite directions to return to the state in FIG. 23.

The front end portions of the support blocks 294 and 295 project forward farther than the front edge of the plate 290, and rollers 306 and 307 consisting of rubber are attached to the end faces of these front end portions. These rollers 306 and 307 are brought into contact with each other when the spacing between the support blocks 294 and 295 is minimized. In addition, the roller 307 is rotated by a motor 308 fixed to the support block 295.

Guide members 310 and 311 are provided in the lower portions of the front end faces of the support blocks 294 and 295, respectively. In clamping the second optical fiber 210 between the rollers 306 and 307, the guide members 310 and 311 surround the second optical fiber 210 to reliably feed the fiber to a portion between the rollers 306 and 307. The guide members 310 and 311 are mounted on the support blocks 294 and 295, respectively, through compression springs 312 so as to be elastically biased toward a central line CL of the fourth base 252. Referring to FIGS. 22 to 24, reference numeral 314 denotes a wire-like guide for guiding the second optical fiber 210 to the portion between the rollers 306 and 307 in pulling up the second optical fiber 210. This guide 314 is attached to the front edge portion of the plate 290 and extends forward (in the arrow X direction).

In FIG. 22, a guide rail 316 extending in the Z direction is mounted on the front surface of the plate 288, and a hand unit 318 is so mounted on the plate 288 as to be movable along this guide rail 316. As in the first embodiment, the hand unit 318 consists primarily comprises a unit box 320, a support pipe 322, a pair of gripper members (not shown in FIG. 22), and a cover 324. The unit box 320 is moved along the guide rail 316 by a feed screw (not shown) which is rotated by a motor (not shown). The support pipe 322 is mounted on the unit box 320 and extends toward a position between the support blocks 294 and 295 along the moving direction of the unit box 320. The gripper members are supported by the distal end of the support pipe 322. The cover 324 covers the gripper members.

Figure 25:
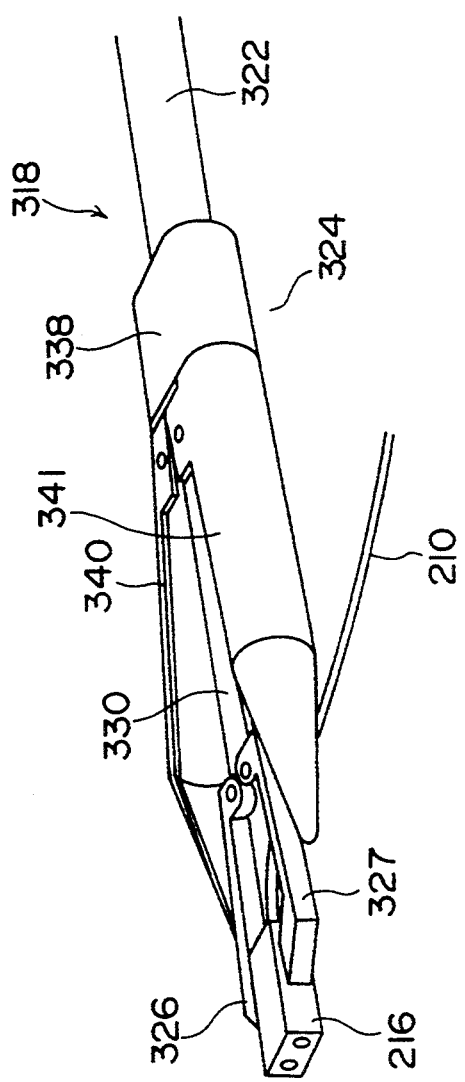
FIG. 25 is a perspective view showing a portion of a hand unit used in the switching apparatus in FIG. 12.
Figure 26:
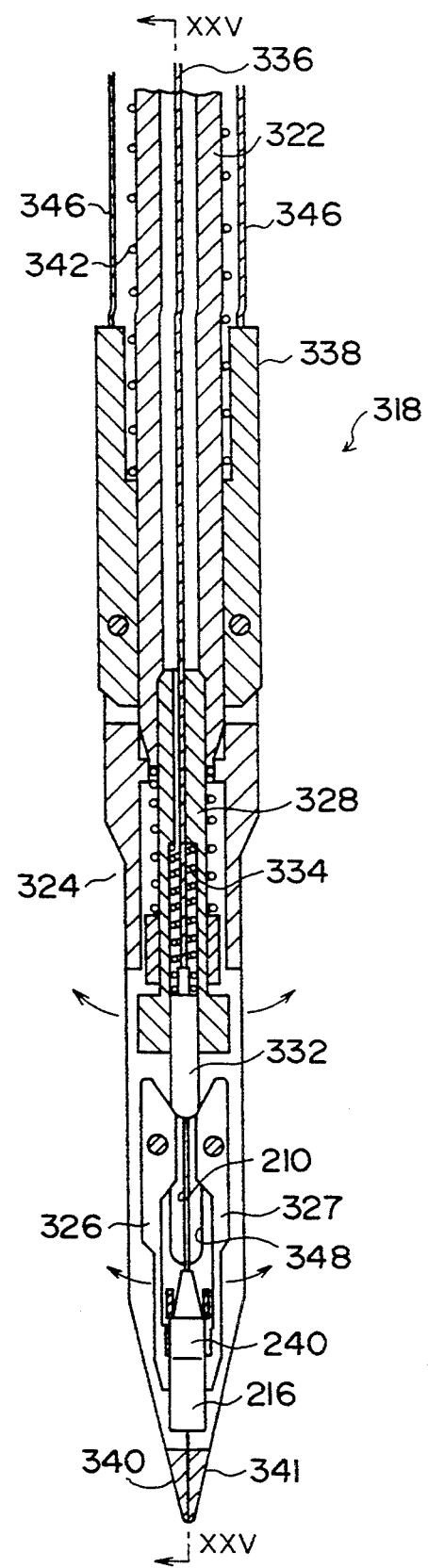
FIG. 26 is a longitudinal sectional view of the hand unit in FIG. 25.
Figure 27:
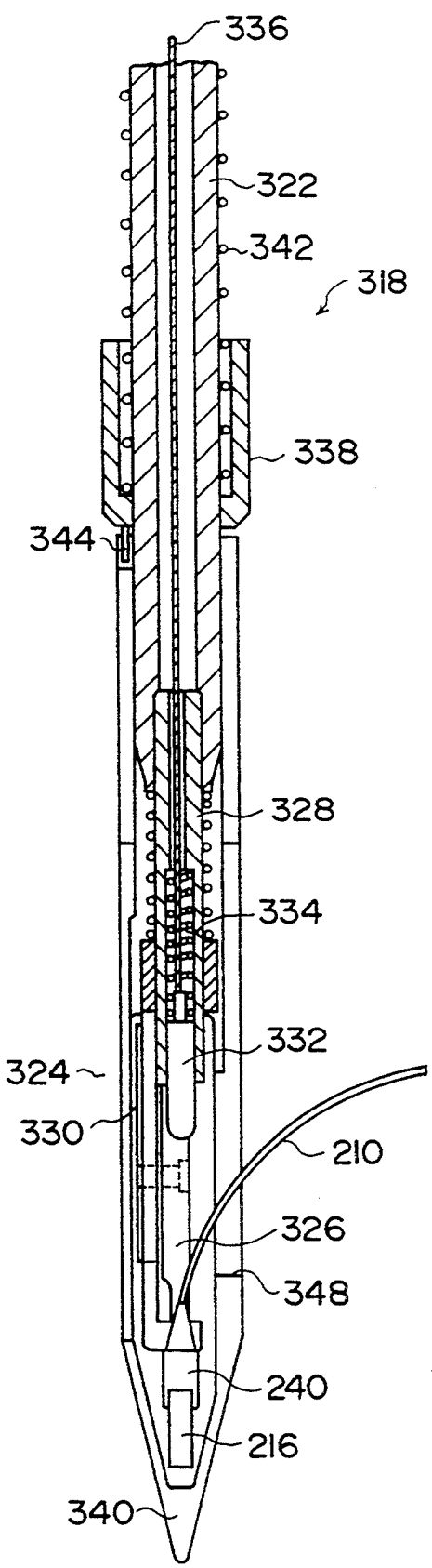
FIG. 27 is a sectional view taken along the line XXV—XXV in FIG. 26.

FIGS. 25 to 27 illustrate details of the arrangement of the support pipe 322, gripper members 326 and 327, and the cover 324 of the hand unit 318. A hollow pipe 328 is coaxially connected to the end portion (the lower end portion when the fourth base 252 is in the upright position) of the support pipe 322. The gripper members 326 and 327 are swingably supported by the end portions of a forked support member 330 provided at the distal end of the hollow pipe 328. A compression spring (not shown) is provided between the distal ends of the gripper members 326 and 327 and constantly biases the gripper members 326 and 327 to open their distal ends. A push rod 332 is slidably arranged inside the hollow pipe 328. The distal end of this push rod 332 is urged against a portion between the proximal end portions of the gripper members 326 and 327 by a compression spring 334 arranged inside the hollow pipe 328, thereby closing the distal ends of the gripper members 326 and 327 against the biasing force of the compression spring between the gripper members 326 and 327. In the state in which this push rod 332 is inserted between the gripper members 326 and 327, the second ferrule 216 discussed earlier, together with the locking leaf springs 236, can be gripped between the distal ends of the gripper members 326 and 327. A pulling wire 336 is connected to the proximal end of the push rod 332. This pulling wire 336 is connected to an appropriate driving mechanism, such as a solenoid actuator (not shown) provided in the unit box 320, through the hollow pipe 328 and the support pipe 322. When the pulling wire 336 is pulled toward the unit box 320 by controlling this driving mechanism, the push rod 332 is detached from the gripper members 326 and 327. Consequently, the distal ends of the gripper members 326 and 327 are opened to release the second ferrule 216 from the gripped state.

The cover 324 for covering the gripper members 326 and 327 is formed at the distal end of the support pipe 322. When closed, this cover 324 assumes a tapered bullet-like shape and thereby prevents the gripper members 326 and 327 from contacting the second optical fiber 210 to damage the second optical fiber 210 or to interfere with a smooth operation of the hand unit 318, in detaching the second ferrule 216 from the optical fiber connecting board 206 or inserting the second ferrule 216 into the optical fiber connecting board 206. The cover 324 is constituted by a support ring 338 slidably fitted on the outer circumferential surface of the support pipe 322, and a pair of substantially semi-cylindrical cover members 340 and 341 so attached as to be swingable to the distal end of the support ring 338. The support ring 338 is urged toward the front end by a compression spring 342 attached to the support pipe 322, and the cover members 340 and 341 are biased in a direction in which they are closed by a spring 344 attached to the support ring 338. Normally, therefore, the cover members 340 and 341 are closed. When the support ring 338 is moved toward the unit box 320, the support pipe 322 is brought into contact with the inner surfaces of the cover members 340 and 341 to open the cover members 340 and 341, as in FIG. 25. As the means for pulling the support ring 338 toward the unit box 320, it is favorable to use a pulling wire 346 which is pulled by a proper driving mechanism (not shown) inside the unit box 320.

Note that reference numeral 348 in FIG. 27 denotes an opening formed in the closed cover 324. Through this opening 348, the second optical fiber 210 extending from the second ferrule 216, which is gripped by the gripper members 326 and 327 in the cover 324, is passed.

The fourth base 252 has a hook unit 350 for pulling up the second optical fiber 210. Unlike the hook unit used in the first embodiment, the hook unit 350 of the second embodiment includes a removal preventing member 356 for preventing removal of the second optical fiber 210 from a hook 354 attached to the distal end of a support rod 352. As shown in FIG. 22, the hook unit 350 includes a unit box 358, the support rod 352, and the hook 354. The unit box 358 can slide along a guide rail (not shown) formed on the front surface of the plate 288 so as to be parallel to the guide rail 316 of the hand unit 318. The support rod 352 is mounted on the unit box 358 and extends downward along the moving direction of the unit box 358. The hook 354 is formed integrally with the distal end of the support rod 352.

Figure 28:
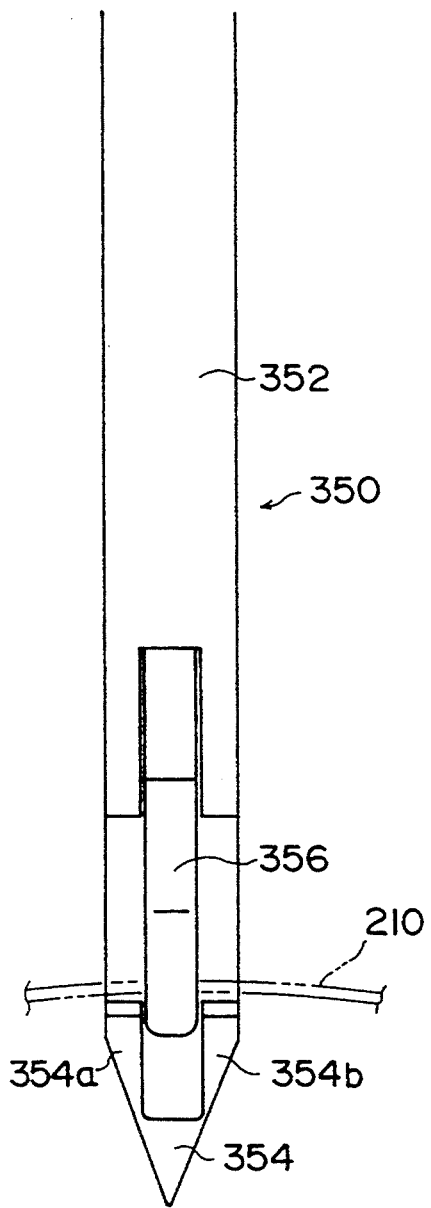
FIG. 28 is a front view showing a portion of a hook unit used in the switching apparatus in FIG. 12.
Figure 29:
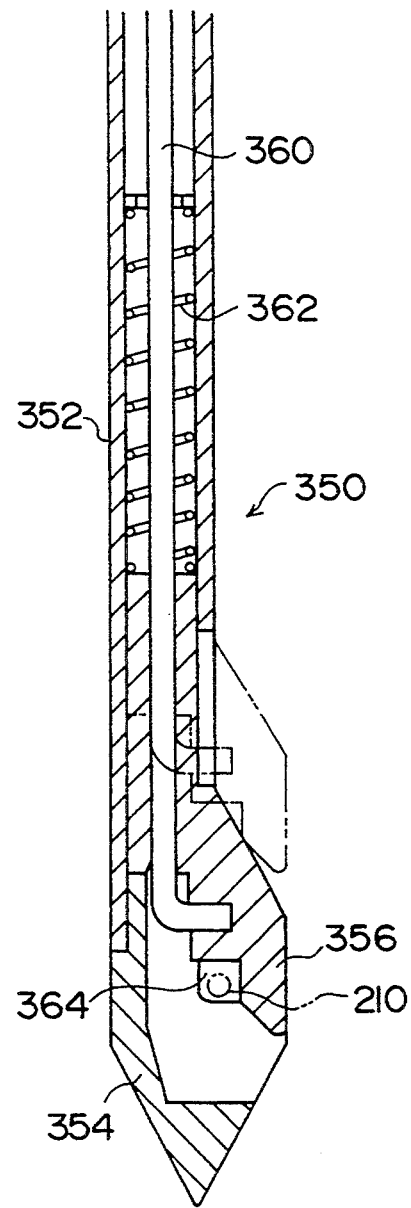
FIG. 29 is a longitudinal sectional view showing the hook unit.

As illustrated in FIGS. 28 and 29, the hook 354 is of a forked shape. The support rod 352 has a hollow structure in which a pulling rod 360 coaxially extends from inside the unit box 358. The distal end of the pulling rod 360 is bent, and the removal preventing member 356 is attached to this bent portion. The removal preventing member 356 is pushed toward the hook 354 by a compression spring 362 provided in the support rod 352, and is normally arranged between forked portions 354a and 354b of the hook 354. In this position, the removal preventing member 356 covers a portion of the hook 354 for receiving the optical fiber 210, and, as can be understood from FIG. 29, forms a closed space 364 together with the hook 354. In this state, it is desirable that the hook 354 and the removal preventing member 356 form a tapered streamline shape as a whole. When the pulling rod 360 is pulled toward the unit box 358 against the biasing force of the compression spring 362, the distal end of the hook 354 is separated from the removal preventing member 356 to form an opening portion which permits insertion and removal of the optical fiber 210, as indicated by alternate long and two dashed lines in FIG. 29. As the means for pulling the pulling rod 360, it is preferred to provide a driving mechanism, such as a solenoid actuator (not shown), inside the unit box 358. In pulling up the second optical fiber 210 of interest, this arrangement of the hook unit 350 prevents the hook unit 350 from erroneously hooking the other second optical fiber 210.

A gripper unit 366 to be used in the step of transferring the second ferrule 216 is also provided on the lower surface of the plate 290 of the fourth base 252. As shown in FIGS. 22 and 24, this gripper unit 366 includes a slider 370 and a pair of gripper members 372 and 373. The slider 370 is slidably mounted on a guide rail 368 formed on the lower surface of the plate 290 and extending in the X direction. The gripper members 372 and 373 are swingably attached to the front end portion of the lower surface of the slider 370. The gripper members 372 and 373 are normally biased by a spring (not shown) in a direction in which their distal ends are opened. The closed state in FIG. 24 is held by a push rod 374 inserted between the rear ends of the gripper members 372 and 373. The push rod 374 is pushed toward the gripper members 372 and 373 by a compression spring 376. This push rod 374, however, can be moved away from the gripper members 372 and 373 by controlling a solenoid actuator 378 mounted on the lower surface of the slider 370. The gripper members 372 and 373 are opened when the push rod 374 is separated from the gripper members 372 and 373.

A rack 380 is mounted on the slide 370 along the X direction, and a pinion 382 meshes with this rack 380. The pinion 382 is rotated by a motor 384 fixed on the upper surface of the plate 290. By rotating the pinion 382, the slider 370 can be reciprocated in the X direction. When the slider 370 is moved to the frontmost position, the gripper members 372 and 373 can grip the second ferrule 216 of the second optical fiber 210 immediately below the space between the rollers 306 and 307.

It should be noted that, as is understood from FIGS. 23 and 24, the gripper members 372 and 373, the support blocks 294 and 295, and the rollers 306 and 307 are arranged symmetrically about the vertical plane including the central line CL of the plate 290 extending in the X direction, and in the upright position of the forth base, the support pipe 322 of the hand unit 318 and the support rod 352 of the hook unit 350 move vertically in this vertical plane.

The operation of the switching apparatus according to this second embodiment when the connections of two second optical fibers 210 are to be switched will be described below. However, the steps of detaching, pulling up, transferring, and connecting the second ferrule 216 are performed in the same manner as in the first embodiment. Therefore, detailed description of essentially the same operations as in the first embodiment will be omitted.

First of all, the step of detaching the second ferrule 216 from the optical fiber connecting board 206 will be described. The cover 324 is kept closed when the hand unit 318 is moved closer to the optical fiber connecting board 206. Since the distal end of the cover 324 is of a tapered streamline shape, the hand unit 318 can be moved forward to a desired position without being caught by the second optical fibers 210 depended from the optical fiber connecting board 206. When the distal end of the cover 324 reaches the position near the second ferrule 216 of interest, the cover 324 is opened by pulling the tension wire 546, exposing the gripper members 326 and 327 from inside the cover 324. The second ferrule 216 is gripped by controlling opening/closing of the gripper members 326 and 327.

The gripping of the second ferrule 216 by the gripper members 326 and. 327 is performed in the manner of urging the spring portions 236a of the locking leaf springs 236 against the side surfaces of the second ferrule 216. As discussed earlier, therefore, the lock portions 236b of the leaf springs 236 are released from the engagement with the grooves 226 of the guide pins 224, and this makes it possible to detach the second ferrule 216 from the optical fiber connecting board 206.

After the second ferrule 216 is gripped, the hand unit 318 is moved backward to completely detach the second ferrule 216 from the optical fiber connecting board 206. The second ferrule 216 is then dropped by opening the gripper members 326 and 327. Thereafter, the cover 324 is returned to the closed state, and the switching robot 214 is returned to the initial position.

The step of pulling up the second ferrule 216 will be described next. To hook the second optical fiber 210 by the hook 354 of the hook unit 350, the hook 354 and the removal preventing member 356 are first set in the closed state as in FIGS. 28 and 29. The hook 354 is moved downward to a position adjacent to the predetermined second optical fiber 210 while the hook 354 is kept in the closed state. In this case, since the distal end of the hook unit 350 is of a streamline shape, the hook 354 can be located at a predetermined position without being interfered with the other second optical fibers 210 extending from the optical fiber arranging board 212.

When the hook 354 is positioned at the position adjacent to the predetermined second optical fiber 210, the removal preventing member 356 is moved upward to form an opening portion between the hook 354 and the removal preventing member 356. In this state, the second optical fiber 210 is displaced laterally along the outer surface of the hook 354. When the opening portion is formed, therefore, the second optical fiber 210 automatically enters the receiving portion 364 of the hook 354 by the elastic returning force of the second optical fiber 210. Thereafter, when the removal preventing member 356 is moved to the original closed position, the second optical fiber 210 is received in the space 364 between the hook 354 and the removal preventing member 356. This prevents removal of the second optical fiber 210 from the hook 354 when the fiber is pulled up.

Subsequently, the second optical fiber 210 is pulled up by raising the hook unit 350. When the vertical portion of the second optical fiber 210 is guided and arranged between the rollers 306 and 307 by the guide 314, the spacing between the support blocks 294 and 295 is narrowed to clamp the second optical fiber 210 between the rollers 306 and 307. At the same time, the removal preventing member 356 is raised to allow removal of the second optical fiber 210 from the hook 354. In this state, the second optical fiber 210 is surrounded and guided by the guide members 310 and 311 immediately below the rollers 306 and 307. Therefore, the second optical fiber 210 is reliably fed between the rollers 306 and 307.

When the second ferrule 216 reaches the position immediately below the space between the rollers 306 and 307 and is transferred to the gripper unit 366 on the lower surface of the plate 290, the hand unit 318 is operated to grip the second ferrule 216 between the gripper members 326 and 327.

Thereafter, the cover 324 is closed with the second ferrule 216 kept gripped between the gripper members 326 and 327. In this state, the fourth base 252 is tilted to the lateral position, and the hand unit 318 is moved toward the optical fiber connecting board 206. Lastly, the cover 324 is opened, and the second ferrule 216 is pushed into a predetermined one of the through holes 218 of the optical fiber connecting board 206. Consequently, the grooves 226 of the guide pins 224 engage with the lock portions 236b of the locking leaf springs 236, completing the connection between the second ferrule 216 and the first ferrule 228.

In the switching apparatus according to this second embodiment, the distal ends of the hand unit 318 and the hook unit 350 are of the streamline shapes. Therefore, these units can move smoothly between the second optical fibers 210. This reduces the possibility of damaging the second optical fibers 210, and also makes a rapid operation possible.

The portions of the second optical fibers between the optical fiber arranging board and the optical fiber connecting board are entangled with each other and suspended in a loosened state or U-shaped state. Therefore, the weight of one second optical fiber is applied on another, resulting in a considerable bending load on each second optical fiber. For this reason, it is desirable that the weight of one second optical fiber per unit length be as small as possible. On the other hand, the second optical fiber is bent when pulled up by the hook, as well as being subjected to the bending load. Therefore, the second optical fiber is required to have rigidity by which the fiber is not broken when bent. Furthermore, the second optical fiber desirably has a hard-to-twist structure.

To meet these requirements, it is possible to increase the thickness of a fiber coating consisting of a synthetic resin. In that case, however, the weight per unit length increases in order to obtain a desired rigidity.

Figure 30:
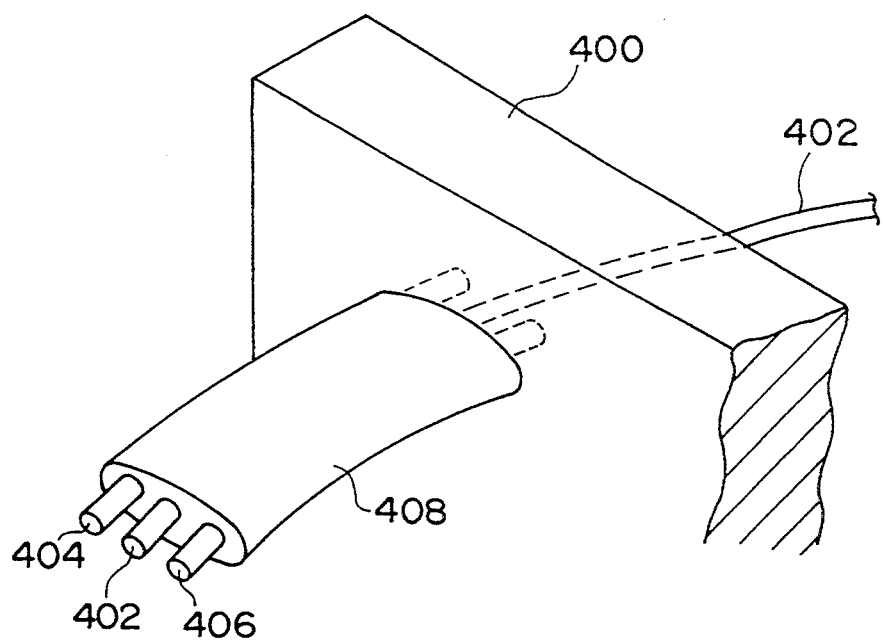
FIG. 30 is a perspective view showing the arrangement of an optical fiber improved in rigidity.

To meet the above requirements without increasing the thickness of the coating, therefore, it is preferred to form one, preferably two optical fibers 404 and 406 in juxtaposition with the portion of a second optical fiber 402 from an optical fiber arranging board 400 to a connector plug or second ferrule (not shown), and to cover the entire structure with a fiber coating 408, thereby constituting a tape-like fiber cable or ribbon fiber cable, as in FIG. 30.

With this arrangement, the optical fibers 404 and 406 juxtaposed to the second optical fiber 402 function to increase the rigidity, and the anisotropic sectional shape makes the cable hard to twist. In addition, a tape-like optical fiber cable of this sort has another advantage of a small weight per unit length, compared to a fiber which is given an equivalent rigidity by increasing the thickness of its fiber coating.

When such a tape-like fiber cable is to be used, it is preferable to embed the ends of the optical fibers 404 and 406 in the optical fiber arranging board 400 and the connector plug or ferrule. In addition, the cable must deflect sufficiently when pulled up by the hook (98, 354). Therefore, the tape-like optical fiber cable is preferably so attached to the optical fiber arranging board 400 that the arranging direction of the optical fibers 402, 404, and 406 is essentially perpendicular to the pulling direction, i.e., is essentially horizontal.

Figure 31:
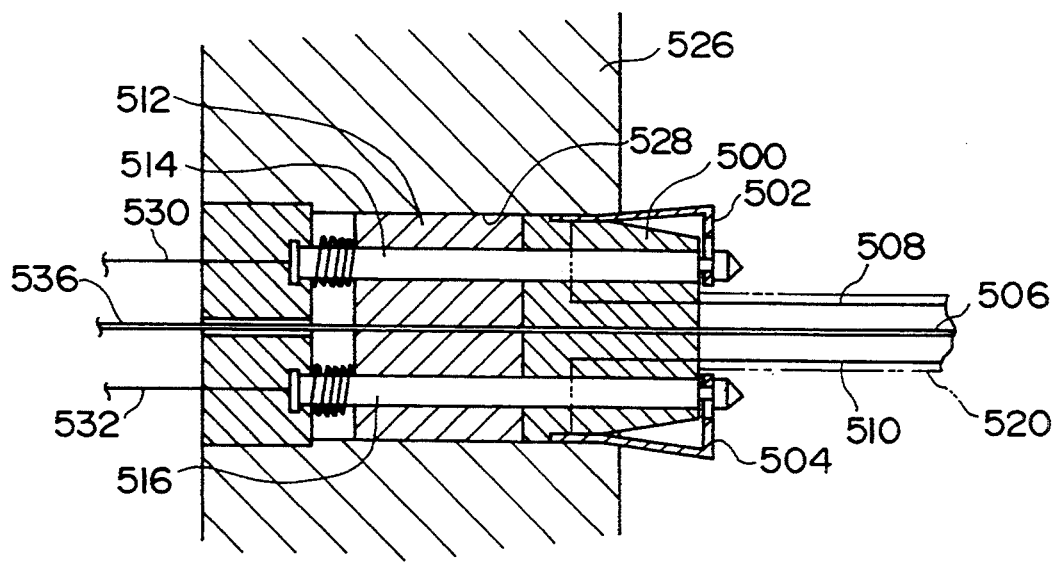
FIG. 31 is a horizontal sectional view showing a connector structure capable of transmitting both optical and electrical signals.

For the purpose of improving the rigidity, it is also possible to use metal wires in place of the optical fibers 404 and 406. When metal wires are used in this way, electrical signal information can be transmitted between the optical fiber connecting board and the optical fiber arranging board by using these metal wires. For example, as illustrated in FIG. 31, in a connector structure similar to that of the second embodiment, metal wires 508 and 510 juxtaposed with a second optical fiber 506 are connected to locking leaf springs 502 and 504 of a second ferrule 500, and the second ferrule 500 is connected to a first ferrule 512. In this arrangement, electrical signal information from the metal wires 508 and 510 can be extracted through the leaf springs 502 and guide pins 516. Therefore, the use of this connector structure makes it possible to constitute an optical-electrical composite transmission line switching apparatus.

Figure 32:
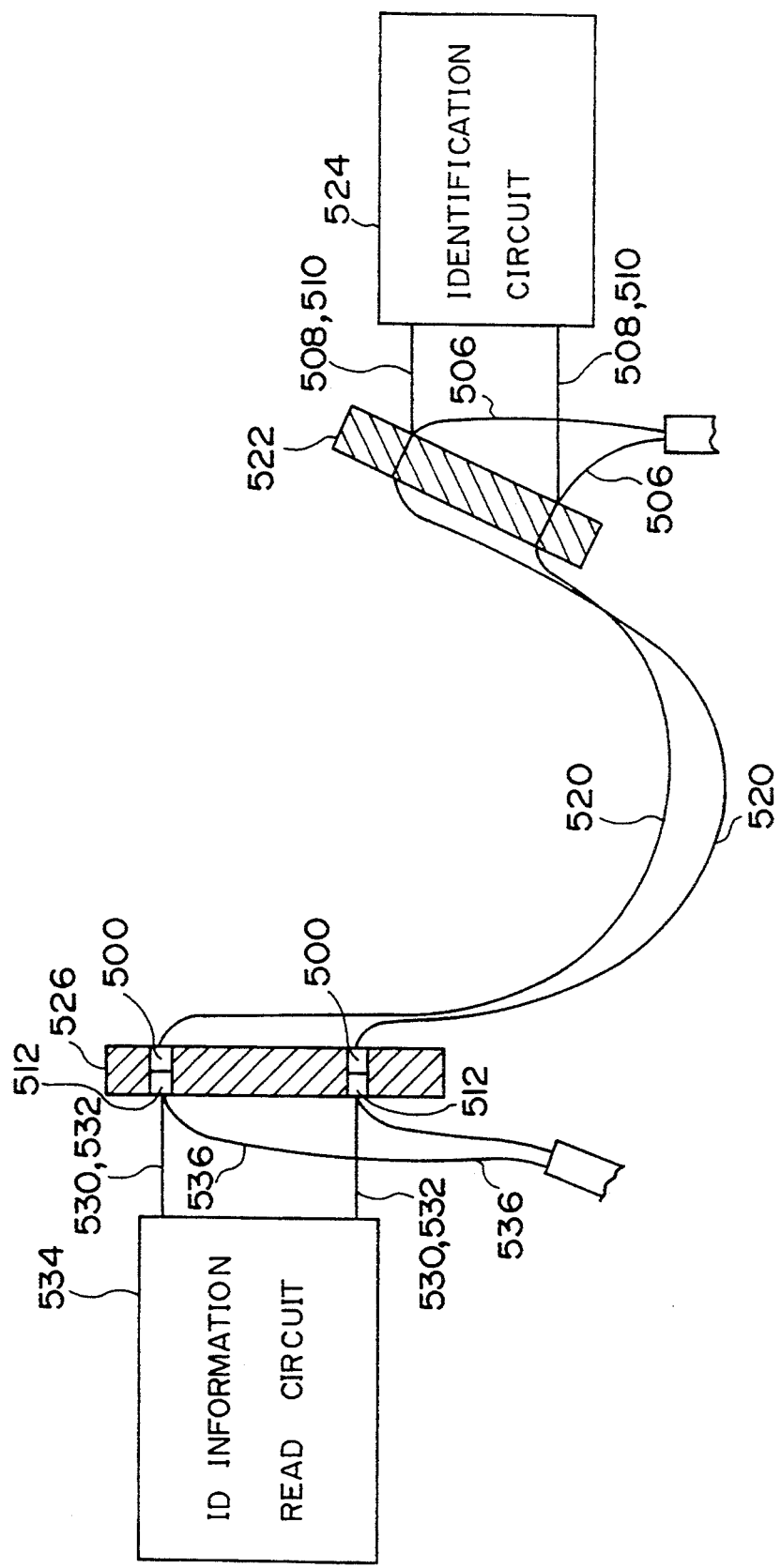
FIG. 32 is a schematic view for explaining a switching apparatus with a line number identifying function using the connector structure in FIG. 31.

FIG. 32 schematically shows an example of an optical fiber switching apparatus which is given a line number identifying function by using the connector structure in FIG. 31. Referring to FIGS. 31 and 32, reference numeral 520 denotes an opto-electric fiber in which the metal wires 508 and 510 are juxtaposed on the both sides of the second optical fiber 506. The metal wires 508 and 510 of each cable 520 are connected to an identification circuit 524 through an optical fiber arranging board 522. This identification circuit 524 can generate an ID digital signal corresponding to the line number of each second optical fiber 506. Guide pins 514 and 516 formed in each through hole 528, which is formed in an optical fiber connecting board 526 and receives the second ferrule 500 at the distal end of the opto-electric cable 520, are connected to an ID information read circuit 534 through conductor wires 530 and 532. When the second ferrule 500 is inserted into one through hole 528 and the guide pins 514 and 516 engage with the locking leaf springs 502 and 504, the ID information read circuit 534 can read out the ID digital signal from the identification circuit 524, identifying the line number of the second optical fiber 506 of the connection destination.

Normally, the state of connections between the first optical fibers 536 and the second optical fibers 506 is monitored by a controller (not shown). If, however, the state of connections between the first optical fibers 536 and the second optical fibers 506 is rendered unclear for some reason, it is possible by this line number identifying function to update the internal memory of the controller at any time by reading out the line number information. This greatly improves the reliability of the switching apparatus in use.

It is also possible to identify the line number of each second optical fiber by connecting a resistor whose resistance differs from one second optical fiber to another between the two metal wires of each opto-electric cable, and by measuring the resistance on the side of the optical fiber connecting board, instead of using the identification circuit for generating digital signals. Details of the line number identifying means using resistors or diodes are described in Japanese Patent Filing No. 5-231608.

Figure 33:
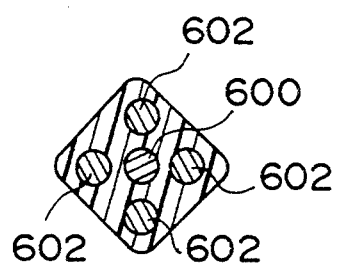
FIG. 33 is a sectional view showing another example of the optical fiber improved in rigidity.
Figure 34:
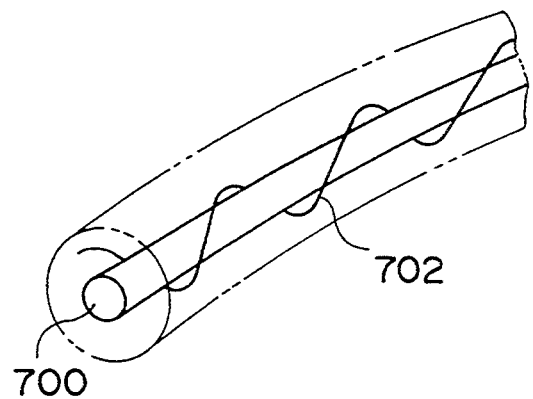
FIG. 34 is a perspective view schematically showing still another example of the optical fiber improved in rigidity.

The arrangement of the optical fibers or the metal wires for improving the rigidity of the second optical fiber is not limited to the juxtaposition. For example, as shown in FIG. 33, four parallel optical fibers or metal wires 602 can be arranged around a second optical fiber 600. Alternatively, a metal wire 702 can be spirally wound on an optical fiber 700, as in FIG. 34.

The present invention has been explained in accordance with its various embodiments, but the invention is of course not limited to the arrangements of the above embodiments. For example, in the above switching robot, both the hand unit as the connector plug inserting/removing means and the hook unit as the second optical fiber pulling means are mounted on the fourth base. However, these units can also be mounted on discrete robots to be driven independent of each other. In addition, it is also possible to change the positional relationship between the optical fiber connecting board and the optical fiber arranging board in accordance with the operating mode of the switching robot.

As has been described above, the present invention makes it possible to readily and rapidly switch the connections of transmission lines such as optical fibers. In addition, the entangled state of the transmission lines can be released temporarily during switching. Therefore, the entangled state is not worsened even if the switching operation is repeatedly performed, and this consequently facilitates maintenance.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. A transmission line switching apparatus comprising:
   a first board for holding a plurality of first transmission lines;
   a second board for holding a plurality of second transmission lines, said second board being disposed apart from said first board with a predetermined spacing therebetween in a horizontal direction; and
   a robot for handling a third transmission line constituted by a flexible elongated body, said third transmission line having one end portion adapted to be held by said second board and connected to one of said second transmission lines and other end portion adapted to be detachably attached to said first board so as to be selectively connected to one of said first transmission lines, said third transmission line adapted to be laterally extended in a loosened state between said first board and said second board when said end portions are respectively held by said first board and said second board.

2. A transmission line switching apparatus according to claim 1, wherein said first board and said second board are arranged to oppose each other and extend vertically.

3. A transmission line switching apparatus according to claim 2, wherein there is a difference in level between an upper edge portion of said first board and an upper edge portion of said second board.

4. A transmission line switching apparatus according to claim 2, wherein said first board extends substantially vertically, and said second board is so inclined that said upper edge portion of said second board is farther than a lower edge portion thereof from said first board in a horizontal direction.

5. A transmission line switching apparatus according to claim 2, wherein said robot includes gripping means for gripping said other end portion of said third transmission line to insert or remove said other end portion into or from said first board, pulling means for pulling up said third transmission line, and transferring means for transferring said other end portion of said third transmission line pulled up by said pulling means to said gripping means.

6. A transmission line switching apparatus according to claim 5, wherein said robot includes a first base capable of being reciprocated along a first direction and extending substantially horizontally from said first board to said second board, a second base supported on said first base and capable of being reciprocated along a second direction and extending substantially horizontally to be perpendicular to the first direction, a third base supported on said second base and capable of being reciprocated along a third direction perpendicular to the first and second directions, and a fourth base supported on said third base and capable of pivoting about an axis extending in the second direction between an upright position in which said fourth base is essentially vertical and a lateral position in which said fourth base is essentially horizontal, and said gripping means, said pulling means, and said transferring means are provided on said fourth base.

7. A transmission line switching apparatus according to claim 6, wherein said gripping means includes a support pipe so supported on said fourth base as to extend substantially vertically when said fourth base is in the upright position, and capable of being reciprocated along the longitudinal direction thereof, and a pair of gripper members provided at one end of said support pipe and capable of being opened/closed so as to grip said other end portion of said third transmission line.

8. A transmission line switching apparatus according to claim 7, wherein said gripping means includes a pair of openable cover members provided at said one end of said support pipe so as to cover said gripper members, and said cover members are so designed as to expose said gripper members when opened, and to assume a streamline outer shape when closed.

9. A transmission line switching apparatus according to claim 6, wherein said pulling means includes a support rod so supported on said fourth base as to extend substantially vertically when said fourth base is in the upright position, and capable of being reciprocated along the longitudinal direction thereof, and a hook provided at one end of said support rod so as to hook and suspend said third transmission line.

10. A transmission line switching apparatus according to claim 9, wherein said pulling means includes a pair of rollers openably supported on said fourth base, and said rollers are so designed as to clamp and feed said third transmission line suspended by said hook.

11. A transmission line switching apparatus according to claim 10, wherein said transferring means includes a support member reciprocatably supported on said fourth, and a pair of gripper members provided to said support member and capable of being opened/closed so as to grip said other end portion of said third transmission line, said gripper members located to be capable of crossing a path of movement of said third transmission line fed from said rollers and a path of movement of said gripper members of said gripping means.

12. A transmission line switching apparatus comprising:
a first board for holding a plurality of first transmission lines;
a second board for holding a plurality of second transmission lines, said second board being disposed apart from said first board with a predetermined spacing therebetween in a horizontal direction;
a third transmission line consisting of a flexible elongated body, said third transmission line having one end portion held by said second board and connected to one of said second transmission lines and other end portion detachably attached to said first board so as to be selectively connected to one of said first transmission lines, said third transmission line being laterally extended in a loosened state between said first board and said second board when said other end portion is attached to said first board; and
a robot for handling said third transmission line.

13. A transmission line switching apparatus according to claim 12, wherein said first board and said second board are arranged to oppose each other and extend vertically.

14. A transmission line switching apparatus according to claim 13, wherein there is a difference in level between an upper edge portion of said first board and an upper edge portion of said second board.

15. A transmission line switching apparatus according to claim 13, wherein said first board extends substantially vertically, and said second board is so inclined that said upper edge portion of said second board is farther than a lower edge portion thereof from said first board in a horizontal direction.

16. A transmission line switching apparatus according to claim 13, wherein said robot includes gripping means for gripping said other end portion of said third transmission line to insert or remove said other end portion into or from said first board, pulling means for pulling up said third transmission line, and transferring means for transferring said other end portion of said third transmission line pulled up by said pulling means to said gripping means.

17. A transmission line switching apparatus according to claim 16, wherein said robot includes a first base capable of being reciprocated along a first direction and extending substantially horizontally from said first board to said second board, a second base supported on said first base and capable of being reciprocated along a second direction and extending substantially horizontally to be perpendicular to the first direction, a third base supported on said second base and capable of being reciprocated along a third direction perpendicular to the first and second directions, and a fourth base supported on said third base and capable of pivoting about an axis extending in the second direction between an upright position in which said fourth base is essentially vertical and a lateral position in which said fourth base is essentially horizontal, and said gripping means, said pulling means, and said transferring means are provided on said fourth base.

18. A transmission line switching apparatus according to claim 17, wherein said gripping means includes a support pipe so supported on said fourth base as to extend substantially vertically when said fourth base is in the upright position, and capable of being reciprocated along the longitudinal direction thereof, and a pair of gripper members provided at one end of said support pipe and capable of being opened/closed so as to grip said other end portion of said third transmission line.

19. A transmission line switching apparatus according to claim 18, wherein said gripping means includes a pair of openable cover members provided at said one end of said support pipe so as to cover said gripper members, and said cover members are so designed as to expose said gripper members when opened, and to assume a streamline outer shape when closed.

20. A transmission line switching apparatus according to claim 17, wherein said pulling means includes a support rod so supported on said fourth base as to extend substantially vertically when said fourth base is in the upright position, and capable of being reciprocated along the longitudinal direction thereof, and a hook provided at one end of said support rod so as to hook and suspend said third transmission line.

21. A transmission line switching apparatus according to claim 20, wherein said pulling means includes a pair of rollers openably supported on said fourth base, and said rollers are so designed as to clamp and feed said third transmission line suspended by said hook.

22. A transmission line switching apparatus according to claim 21, wherein said transferring means includes a support member reciprocatably supported on said fourth, and a pair of gripper members provided to said support member and capable of being opened/closed so as to grip said other end portion of said third transmission line, said gripper members located to be capable of crossing a path of movement of said third transmission line fed from said rollers and a path of movement of said gripper members of said gripping means.

23. A transmission line switching apparatus according to claim 12, wherein said other end portion of said third transmission line has a connector plug attached thereto, and said first board has a plurality of through holes formed therein into each of which said connector plug adapted to be detachably inserted.

24. A transmission line switching apparatus according to claim 23, wherein a sleeve-like connector adapter is fitted in each of said through holes, and said first transmission line and said third transmission line are connected by holding the end portion of said first transmission line in one side of said connector adapted and detachably inserting said connector plug into the other side of said connector adapter.

25. A transmission line switching apparatus according to claim 23, further comprising a closing member for closing an opening portion on one side of said through hole, a first ferrule slidably arranged in said through hole and adapted to hold the end portion of said first transmission line, guide pins fixed to said closing member and projecting from an opening portion on the other side of said through hole through said first ferrule, each of said guide pins having a groove formed in a circumferential surface of the projecting end portion of thereof, and elastic means interposed between said closing member and said first ferrule for biasing said first ferrule away from said closing member.

26. A transmission line switching apparatus according to claim 25, wherein said connector plug includes a second ferrule holding said other end portion of said third transmission line and having guide holes in which said guide pins are fitted when said second ferrule is inserted from said other side of said through hole, and locking elastic members provided on said second ferrule to engage with said grooves of said guide pins, thereby preventing removal of said second ferrule from said guide pins.

27. A transmission line switching apparatus according to claim 26, wherein said locking elastic members are substantially L-shaped leaf springs whose proximal end portions are fixed to side surfaces of said second ferrule, and whose distal end portions extend along a rear end face of said second ferrule so as to cover rear opening portions of said guide holes, each of said leaf springs having lock hole formed in a portion thereof opposing the rear end face of said second ferrule, a portion of a periphery of said lock hole crossing the rear opening portions of said guide holes when no load is applied, and the peripheries of said lock holes are arranged around the rear opening portions of said guide holes when said leaf springs are urged against the side surfaces of said second ferrule.

28. A transmission line switching apparatus according to claim 27, wherein said gripping means of said robot is adapted to grip said second ferrule so as to urge said leaf springs against the side surfaces of said second ferrule.

29. A transmission line switching apparatus according to claim 12, wherein said first, second, and third transmission lines are optical fibers.

30. A transmission line switching apparatus according to, claim 29, wherein said optical fiber as said second transmission line extends through said second board, and a portion of said optical fiber extending from said second board to said first board is said third transmission line.

31. A transmission line switching apparatus according to claim 29, wherein at least another optical fiber is juxtaposed with an optical fiber as said third transmission line.

32. A transmission line switching apparatus according to claim 31, wherein said optical fiber as said third transmission line and said another optical fiber are juxtaposed parallel to each other on the same plane, and held by said second board so that the direction of juxtaposition of said optical fibers is substantially horizontal.

33. A transmission line switching apparatus according to claim 29, wherein at least one metal wire is juxtaposed with said optical fiber as said third transmission line.

34. A transmission line switching apparatus according to claim 33, wherein said metal wire is so formed as to spirally surround said optical fiber as said third transmission line.

35. A transmission line switching apparatus according to claim 33, wherein said optical fiber as said third transmission line and said metal wire are juxtaposed parallel to each other on the same plane, and held by said second board so that the direction of juxtaposition of said optical fiber and said metal wire is substantially horizontal.

36. A transmission line switching apparatus according to claim 33, wherein said first board having conductors to which the end portion of said metal wire is connected when said other end portion of said third transmission line is attached to said first board.

37. A transmission line switching apparatus according to claim 36, wherein said metal wire is connected to identifying means for generating an ID signal for identifying a transmission line, and said conductor is connected to reading means for reading out the ID signal from said identifying means when said metal wire is connected.

38. A transmission line switching method of switching connection positions of a plurality of third transmission lines each constituted by a flexible elongated body laterally extended in a loosened state between a first board for holding a plurality of first transmission lines and a second board, arranged apart from said first board with a predetermined spacing therebetween, for holding a plurality of second transmission lines, one end portion of each of said third transmission lines being held by said second board and connected to one of said second transmission lines, and the other end portion of each of said third transmission lines being detachably attached to said first board so as to be selectively connected to one of said first transmission lines, comprising the steps of:

removing the other end portion of one of said third transmission lines from said first board;

suspending said third transmission line removed from said first board by a hook in the vicinity of said second board and pulling up the other end portion to be higher than the rest of said third transmission lines laterally extended between said first board and said second board; and connecting the other end portion of said pulled third transmission line to another connection position of said first board.

39. A transmission line switching method according to claim 38, wherein said first, second, and third transmission lines are optical fibers.

40. A transmission line switching method according to claim 39, wherein each optical fiber as said second transmission line extends through said second board, and a portion of said optical fiber extending from said second board to said first board is said third transmission line.

* * * * *